(12) United States Patent
Krcmar et al.

(10) Patent No.: US 12,469,316 B1
(45) Date of Patent: *Nov. 11, 2025

(54) AUTHENTICATION AND IDENTIFICATION OF PHYSICAL OBJECTS USING MICROSTRUCTURAL FEATURES

(71) Applicant: Veracity Protocol Inc., New York, NY (US)

(72) Inventors: Jakub Krcmar, Prague (CZ); Roman Komarek, Prague (CZ); Kamil Behun, Kuřim (CZ)

(73) Assignee: Veracity Protocol Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/246,671

(22) Filed: Jun. 23, 2025

Related U.S. Application Data

(63) Continuation-in-part of application No. 19/219,784, filed on May 27, 2025, and a continuation-in-part of
(Continued)

(51) Int. Cl.
*G06V 20/80* (2022.01)
*G06F 16/28* (2019.01)
(Continued)

(52) U.S. Cl.
CPC ............ *G06V 20/80* (2022.01); *G06F 16/289* (2019.01); *G06V 10/454* (2022.01); *G06V 10/82* (2022.01); *G06V 20/698* (2022.01)

(58) Field of Classification Search
CPC .... G06V 20/80; G06V 10/454; G06V 20/698; G06V 10/82; G06F 16/289
(Continued)

(56) References Cited

U.S. PATENT DOCUMENTS 8,180,174 B2 * 5/2012 Di Venuto ........... G06V 10/242
382/209
9,245,133 B1 * 1/2016 Durst .................... G06F 21/602
(Continued)

FOREIGN PATENT DOCUMENTS

CN 109919252 B * 9/2020 ........... G06V 10/806
CN 118116036 B * 10/2024 ............. G06N 3/092
(Continued)

*Primary Examiner* — Tauqir Hussain
(74) *Attorney, Agent, or Firm* — MUGHAL GAUDRY & FRANKLIN PC

(57) ABSTRACT

The present disclosure relates to a method for authentication of an object based on microstructural features extracted from an input surface of the object. Input surfaces of the object are processed by a feature extractor using a deep neural network from images of the object captured by a device camera. The input surfaces vary in dimensions. The feature extractor outputs an input surface uniformly sized with respect to sizes of the input surfaces. The input surface is divided into micro-surfaces which are used to train the feature extractor to identify microstructural features of the input surface. The feature extractor is applied on surfaces of other objects that have different dimensions from the input surfaces. Microstructural features of the surfaces of the objects are stored in a database. The feature extractor authenticates query objects by matching the microstructural features of a query object with the microstructural features of the other objects.

18 Claims, 18 Drawing Sheets

Related U.S. Application Data application No. 19/217,957, filed on May 23, 2025, and a continuation-in-part of application No. 18/793,270, filed on Aug. 2, 2024, and a continuation-in-part of application No. 18/783,167, filed on Jul. 24, 2024, and a continuation-in-part of application No. 18/769,223, filed on Jul. 10, 2024, and a continuation-in-part of application No. 18/769,212, filed on Jul. 10, 2024, and a continuation-in-part of application No. 18/651,518, filed on Apr. 30, 2024, and a continuation-in-part of application No. 18/437,080, filed on Feb. 8, 2024.

(60) Provisional application No. 63/489,988, filed on Mar. 13, 2023, provisional application No. 63/489,992, filed on Mar. 13, 2023, provisional application No. 63/489,993, filed on Mar. 13, 2023, provisional application No. 63/489,989, filed on Mar. 13, 2023, provisional application No. 63/489,991, filed on Mar. 13, 2023, provisional application No. 63/489,995, filed on Mar. 13, 2023, provisional application No. 63/483,896, filed on Feb. 8, 2023, provisional application No. 63/483,900, filed on Feb. 8, 2023, provisional application No. 63/483,887, filed on Feb. 8, 2023, provisional application No. 63/483,893, filed on Feb. 8, 2023, provisional application No. 63/483,903, filed on Feb. 8, 2023.

(51) Int. Cl.
*G06V 10/44* (2022.01)
*G06V 10/82* (2022.01)
*G06V 20/69* (2022.01)

(58) Field of Classification Search
USPC .......................................................... 713/168
See application file for complete search history.

(56) References Cited

U.S. PATENT DOCUMENTS

| | | | |
|---|---|---|---|
| 10,289,910 B1* | 5/2019 | Chen | G06V 20/46 |
| 10,691,971 B2* | 6/2020 | Chang | G06F 18/24 |
| 10,964,010 B2* | 3/2021 | Di Venuto Dayer, V | G06T 7/0004 |
| 11,100,352 B2* | 8/2021 | Lee | G06T 7/70 |
| 11,637,687 B2* | 4/2023 | Smith | H04L 9/008 713/168 |
| 11,900,646 B2* | 2/2024 | Amon | G06V 10/454 |
| 12,051,253 B2* | 7/2024 | Almers | G06V 20/698 |
| 12,078,597 B2* | 9/2024 | Liu | G06N 3/0464 |
| 12,249,074 B2* | 3/2025 | Cho | G06V 10/764 |
| 2009/0245596 A1* | 10/2009 | Niinuma | G06V 40/40 382/190 |
| 2012/0219194 A1* | 8/2012 | Monden | G06V 40/1382 382/124 |
| 2013/0170758 A1* | 7/2013 | G | G06K 19/086 382/218 |
| 2015/0117701 A1* | 4/2015 | Ross | G06V 10/225 382/100 |
| 2015/0189238 A1* | 7/2015 | Ishiyama | G06T 7/40 348/86 |
| 2015/0302421 A1* | 10/2015 | Caton | G06K 19/06037 705/17 |
| 2017/0287147 A1* | 10/2017 | Takahashi | G06T 7/35 |
| 2020/0380359 A1* | 12/2020 | Finnie | G06F 18/24 |
| 2022/0157048 A1* | 5/2022 | Ting | G06N 3/084 |

FOREIGN PATENT DOCUMENTS

| | | | | |
|---|---|---|---|---|
| CN | 119445149 A * | 2/2025 | | G16H 50/70 |
| WO | WO-2007028799 A1 * | 3/2007 | | G06V 10/242 |
| WO | WO-2015157526 A1 * | 10/2015 | | G06N 3/084 |
| WO | WO-2022031232 A1 * | 2/2022 | | G06N 3/045 |
| WO | WO-2023114776 A1 * | 6/2023 | | G06N 3/0464 |

* cited by examiner

AUTHENTICATION AND IDENTIFICATION OF PHYSICAL OBJECTS USING MICROSTRUCTURAL FEATURES

PRIORITY

This application is a continuation in part of (1) U.S. patent application Ser. No. 18/783,167, filed Jul. 24, 2024, and entitled "AUTHENTICATION AND IDENTIFICATION OF PHYSICAL OBJECTS USING FIXED-SIZE REPRESENTATION"; (2) U.S. patent application Ser. No. 18/793,270, filed Aug. 2, 2024, and entitled "AUTHENTICATION AND IDENTIFICATION OF PHYSICAL OBJECTS USING VOTING OF LOCAL MICROSTRUCTURAL FEATURES"; (3) U.S. patent application Ser. No. 19/219,784, filed May 27, 2025, and entitled "AUTHENTICATION AND IDENTIFICATION OF PHYSICAL OBJECTS USING MICROSTRUCTURAL FEATURES" (36VP9-CON1); (4) U.S. patent application Ser. No. 18/769,223, filed Jul. 10, 2024, and entitled "AUTHENTICATION AND IDENTIFICATION OF PHYSICAL OBJECTS USING MICROSTRUCTURAL FEATURES"; (5) U.S. patent application Ser. No. 18/769,212, filed Jul. 10, 2024, and entitled "AUTHENTICATION AND IDENTIFICATION OF PHYSICAL OBJECTS USING MACHINE VISION PROTOCOLS"; (6) U.S. patent application Ser. No. 19/217,957, filed May 23, 2025, and entitled "AUTHENTICATION AND IDENTIFICATION OF PHYSICAL OBJECTS USING IMMUTABLE PHYSICAL CODE" (36VP7-CIP2); (7) 18/651,518, filed Apr. 30, 2024, and entitled "AUTHENTICATION AND IDENTIFICATION OF PHYSICAL OBJECTS USING IMMUTABLE PHYSICAL CODE"; and (8) U.S. patent application Ser. No. 18/437,080, filed Feb. 8, 2024, and entitled "AUTHENTICATION AND IDENTIFICATION OF PHYSICAL OBJECTS USING IMMUTABLE PHYSICAL CODE". U.S. patent application Ser. No. 18/437,080, filed Feb. 8, 2024, and entitled "AUTHENTICATION AND IDENTIFICATION OF PHYSICAL OBJECTS USING IMMUTABLE PHYSICAL CODE" is a non-provisional of and claims priority benefit to the following U.S Provisional Patent Applications: (1) U.S. Patent Application No. 63/483,887, filed Feb. 8, 2023, and entitled "SYSTEMS AND METHODS FOR ENHANCED AUTHENTICATION AND IDENTIFICATION OF PHYSICAL OBJECTS"; (2) U.S. Patent Application No. 63/483,893, filed Feb. 8, 2023, and entitled "SYSTEMS AND METHODS FOR ENHANCED AUTHENTICATION AND Application No. 63/483,896, filed Feb. 8, 2023, and entitled "SYSTEMS AND METHODS FOR ENHANCED AUTHENTICATION AND IDENTIFICATION OF PHYSICAL OBJECTS"; (4) U.S. Patent Application No. 63/483,900, filed Feb. 8, 2023, and entitled "SYSTEMS AND METHODS FOR ENHANCED AUTHENTICATION AND IDENTIFICATION OF PHYSICAL OBJECTS"; (5) U.S. Patent Application No. 63/483,903, filed Feb. 8, 2023, and entitled "SYSTEMS AND METHODS FOR ENHANCED AUTHENTICATION AND IDENTIFICATION OF PHYSICAL OBJECTS"; (6) U.S. Patent Application No. 63/489,995, filed Mar. 13, 2023, and entitled "AUTHENTICATION AND IDENTIFICATION OF PHYSICAL OBJECTS USING IMMUTABLE PHYSICAL CODE"; (7) U.S. Patent Application No. 63/489,993, filed Mar. 13, 2023, and entitled "AUTHENTICATION AND IDENTIFICATION OF PHYSICAL OBJECTS USING MACHINE VISION PROTOCOLS"; (8) U.S. Patent Application No. 63/489,992, filed Mar. 13, 2023, and entitled "AUTHENTICATION AND IDENTIFICATION OF PHYSICAL OBJECTS USING MICROSTRUCTURAL FEATURES"; (9) U.S. Patent Application No. 63/489,991, filed Mar. 13, 2023, and entitled "AUTHENTICATION AND IDENTIFICATION OF PHYSICAL OBJECTS USING VOTING OF LOCAL MICROSTRUCTURAL FEATURES"; (10) U.S. Patent Application No. 63/489,989, filed Mar. 13, 2023, and entitled "AUTHENTICATION AND IDENTIFICATION OF PHYSICAL OBJECTS USING SELECTION OF STRONG MICROSTRUCTURAL FEATURES"; and (11) U.S. Patent Application No. 63/489,988, filed Mar. 13, 2023, and entitled "AUTHENTICATION AND IDENTIFICATION OF PHYSICAL OBJECTS USING FIXED-SIZE REPRESENTATION". The contents of the aforementioned applications are incorporated herein by reference in their entirety.

BACKGROUND

The present disclosure generally relates to systems and methods for verifying the authenticity and/or recognizing the identity of an individual physical object or a batch of physical objects of any material with any camera or hardware, an immutable function, and machine learning algorithms.

The identification and authentication of physical objects are essential for various industries, such as retail, manufacturing, pharmaceutical, food, automotive, logistic etc. These industries face multiple challenges while trying to verify the identity of physical objects in various conditions such as different materials used in manufacturing, various camera angles while capturing images of the objects, camera perspectives, and varying lighting conditions. The physical attachment of an identifier to a physical object has various challenges. Most often, the identifier is physically attached or printed on the cover of a physical object that is required to be removed for use of the product.

Moreover, the identifiers permanently attached to objects often tend to fade with usage and time. Furthermore, many critical items cannot be tagged with an identifier at all, making it impossible to track them until now. As the identity of an associated object relies completely on the attached identifier, such situations result in the loss of object identity information. In fact, printable identifiers are easy to duplicate and attach to counterfeit objects to result in an increased supply of counterfeit goods. Furthermore, many critical items cannot be tagged with an identifier at all, making it impossible to track them until now.

Another challenge arises with scanning the identifier for authentication or identification of the associated object. Variations in environmental conditions such as lighting, configuration and specification of scanner used, etc. add up to the challenges. Even barcode scanners can have difficulty reading consistently. Holographic stickers can be counterfeited too and degrade with usage for used goods.

A technical problem arises when using digital images to perform authentication or identification of physical objects. A wide range of techniques exist for verifying the authenticity and identity of a physical object. Conventional techniques will compare images of physical objects and match those images. Lighting, optical camera variations, wear and tear, changes in shape of object, incorrect alignment, and numerous other factors render image matching unreliable. The identification and verification of the physical objects in different conditions are necessary to ensure the authenticity of products and prevent losses due to counterfeiting, address the issue of tracking previously untraceable items, and ensure their secure digital passporting.

SUMMARY

The present disclosure relates to systems and methods for using any camera to generate a tamper-proof physical code that represents the distinctive material structure of a physical object or a batch of physical objects. The physical code, computer vision, and machine-learning techniques can be used to determine whether the physical object is authentic or a fake or counterfeit replica of the original physical object. The present disclosure also relates to techniques for determining the identity of an object or a batch of objects based on material characteristics on the surface of the object distinctive. Various embodiments of the present disclosure relate to a system for machine authentication of a physical object using computer vision and machine learning (ML) algorithms for comparing attributes of the physical object and various processes for a method thereof.

In an embodiment, the method includes a method for authentication of a physical object based on microstructural features extracted from patches of a surface of the physical object. In one step, a plurality of input surfaces of an object are processed by a feature extractor using a deep neural network. The plurality of input surfaces varies in dimensions, and the plurality of input surfaces are processed by the deep neural network from a plurality of images of the object captured by a device camera. The feature extractor outputs an input surface from the plurality of input surfaces which is uniformly sized with respect to sizes of the plurality of input surfaces. The input surface of the object is divided into a plurality of micro-surfaces. The feature extractor is trained on the plurality of micro-surfaces to identify a plurality of microstructural features of the input surface of the object. The trained feature extractor is applied on a plurality of surfaces corresponding to a plurality of objects. The plurality of surfaces has different dimensions from the plurality of input surfaces. A set of microstructural features of the plurality of surfaces corresponding to the plurality of objects is stored in a database. The trained feature extractor is used for authenticating a plurality of query objects based on the plurality of microstructural features of the input surface corresponding to each query object. The authentication includes matching the plurality of microstructural features obtained from images of a query object with the set of microstructural features of the plurality of objects stored in the database.

In another embodiment, the method further includes that the input surface is a digital image of the input surface of the object.

In yet another embodiment, the method further includes a pooling layer of the feature extractor is one of: an average pooling layer in a neural network, a global maximum pooling layer in the neural network, a global sum pooling layer in the neural network or a global generalized mean pooling layer in the neural network.

In yet another embodiment, the method further includes the feature extractor is based on a convolutional neural network.

In yet another embodiment, the method further includes each of the plurality of microstructural features of the input surface of the query object matches or differs with one or more of the microstructural features in the database.

In yet another embodiment, the method further includes the plurality of microstructural features are filtered to select microstructural features having a maximum inclusion in one or more input surfaces of the plurality of input surfaces.

In some aspects of the present disclosure, the feature extractor provides a feature set describing the input surface of the object, and the feature set is a one-dimensional feature vector.

Other embodiments of this aspect include corresponding computer systems, apparatus, and computer programs recorded on one or more computer storage devices, each configured to perform the actions of the methods.

Some other embodiments include a computer-program product tangibly embodied in a non-transitory machine-readable storage medium, including instructions configured to cause a data processing apparatus to perform operations of the method for machine authentication of a physical object using computer vision and ML algorithms for comparing attributes of the physical object.

Further areas of applicability of the present disclosure will become apparent from the detailed description provided hereinafter. It should be understood that the detailed description and specific examples while indicating various embodiments, are intended for purposes of illustration only and are not intended to necessarily limit the scope of the disclosure.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

In the appended figures, similar components and/or features may have the same reference label. Further, various components of the same type may be distinguished by following the reference label with a second alphabetical label that distinguishes among the similar components. If only the first reference label is used in the specification, the description applies to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
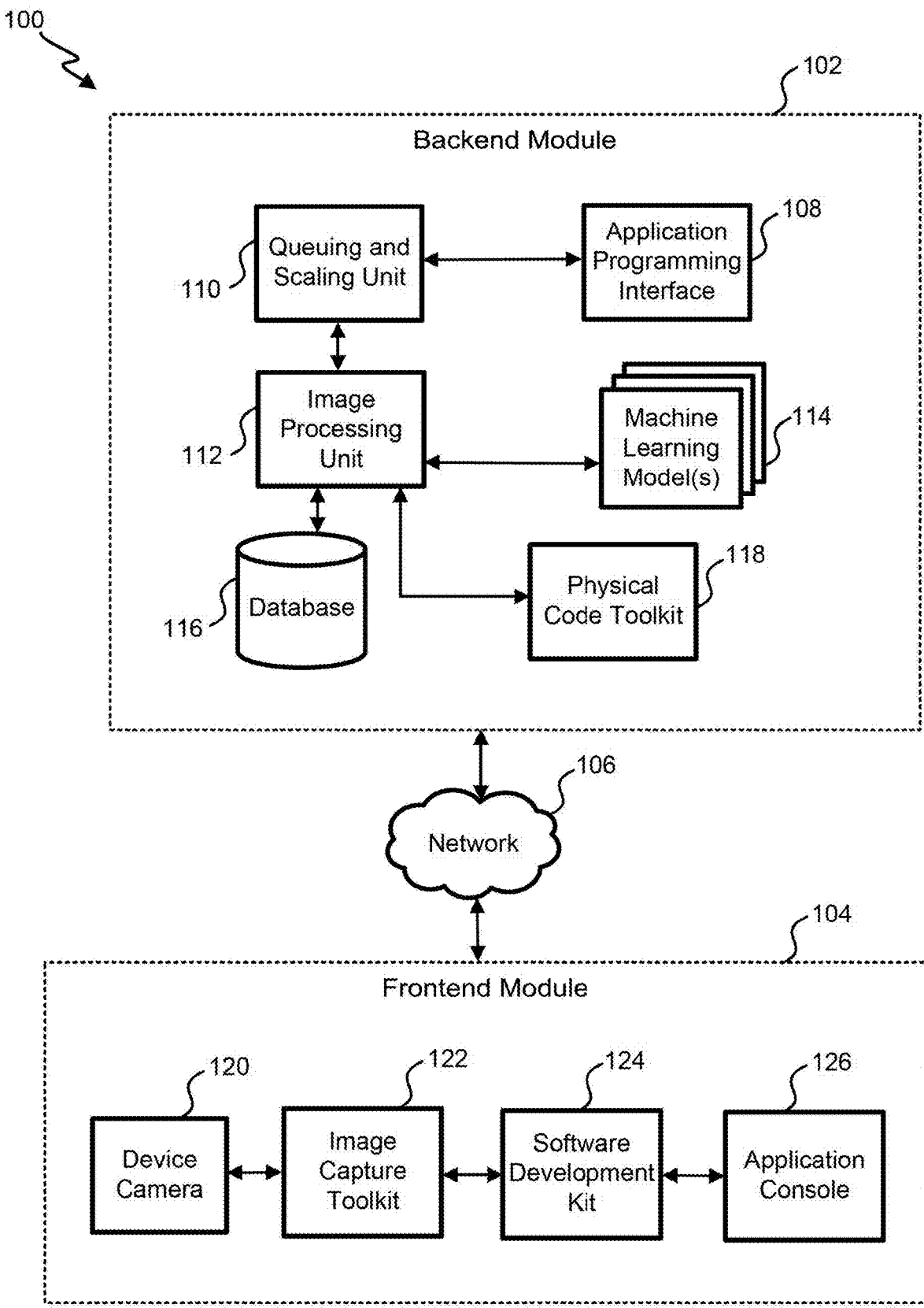
FIG. 1 illustrates a block diagram of a system for the identification or authentication of a physical object, according to an exemplary embodiment.

FIG. 1 is a block diagram of system 100 for identification or authentication of a physical object, according to an exemplary embodiment. System 100 provides authentication of a physical object (hereinafter interchangeably referred to as 'object') or a batch of objects by comparing attributes of the physical object using computer vision and Machine Learning (ML) algorithms. System 100 includes a backend module 102 and a frontend module 104 communicatively coupled to each other by a network 106.

Backend module 102 represents infrastructure to enable access to pre-trained Machine Learning models, image processing operations, queuing and scaling operations, and finally creating physical code that represents physical objects or batch of objects, including their storage in a database. Backend module 102 can have data processing components and toolkits that may be locally at an edge, cloud, hybrid, or any combination thereof. In some embodiments, backend module 102 may be integral to a hardware station (i.e., a facility having one or more data processing servers) such that one or more hardware components (such as data processing circuitries and/or data storage circuitries) of the hardware station can be deployed for a variety of tasks associated with identification or authentication of the physical object.

According to an exemplary embodiment, backend module 102 includes Application Programming Interface (API) 108, queuing and scaling unit 110, image processing unit 112, and database 116. Backend module 102 further includes Machine Learning (ML) models 114 and physical code toolkit 118 coupled to image processing unit 112. ML models 114 and physical code toolkit 118 support image processing unit 112 to perform a variety of Artificial Intelligence (AI) based operations and a variety of data processing operations for authentication and/or identification of an object. Typically, the operations may be associated with image processing, notification generation, and/or data communication. Examples of ML models 114 may include but are not limited to Recommender Systems, Decision Trees and Random Forests, a variety of Neural Networks (such as Convolution Neural Networks (CNN), Recurrent Neural Networks (RNN), and the like), Transformer AI Architecture, Support Vector Machines (SVM), eXtreme Gradient Boosting (i.e., XGBoost), and Gradient Boosting Machines. Database 116 may include data storage repositories configured to store and communicate data associated with various operations of backend module 102. In some embodiments, database 116 may be a shared distributed ledger (such as Web3-based shared datacenter) or log file accessible by user device(s).

Frontend Module 104 represents infrastructure that enables a user to receive instruction(s) from an end-user (hereinafter interchangeably referred to as 'user'), capture images of physical object(s) (or batch(es) of physical object(s)), communicate the images to backend module 102, receive result(s) from backend module 102, and present the result(s) to the end-user of the user device hosting frontend module 104. In some exemplary embodiments, frontend module 104 may be integral to the user device. The user device may be a handheld smart device such as a smartphone, a tablet PC, a camera enabled smart gadget, and the like.

Frontend module 104 includes device camera 120 (such as smartphone camera, industrial camera, scanner, Vision Pro etc.), image capture toolkit 122, Software Development Kit (SDK) 124, and application console 126. Image capture toolkit 122 enables device camera 120 to capture image(s) of physical object(s) and/or images of batch(es) of object(s). The images (cumulatively referring to 'the images of the object and/or images of batch(es) of objects') may be provided in a compressed format (JPEG, GIF, PNG, etc.) or in RAW image format (i.e., with minimally processed data) with metadata associated with the image and device camera 120. A number of images of the object are captured by the device camera 120 with different materials and shapes, by using different cameras and devices, in different lighting conditions, and in different alignments of the object. Image capture toolkit 122 may include graphical processing circuitry to enable the camera to capture image(s) of the object with a pre-defined specification. Image capture toolkit 122 may further be configured to enable image blur detection, HDR image processing, image auto-crop, image quality capture and transmission of image(s) of the object when captured with the pre-defined specification. In some embodiments, device camera 120 includes a graphical processor in a hybrid module or even in a single semiconductor chip. SDK 124 provides infrastructure and tools to build unique software application(s) that enables the user to communicate with backend module 102 via application console 126.

Frontend Module 104 may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®).

In some other embodiments, image capture toolkit 122 may include laser scanner module(s). The laser scanner module(s) may include laser scanner(s). The laser scanner(s) may perform a 3-Dimensional (3D) scan of the object and generate point cloud(s) based on the scan. The laser scanner(s) may further derive precise information of the object using the point clouds and generate image(s) of the object using the precise information. In some aspects of the present disclosure, the laser scanner module(s) may further include laser interferometer(s) to determine information related to material composition(s) of the object.

Network 106 may include suitable logic, circuitry, and interfaces configured to provide several network ports and several communication channels for transmission and reception of data and/or instructions related to operations of backend module 102 and frontend module 104.

Examples of network 106 may include Wide Area Network (WAN), Local Area Network (LAN), internet, and/or communication networks of any type for various embodiments. In some embodiments, system 100 may have multiple backend Modules (similar to backend module 102) and multiple frontend modules (similar to frontend module 104) throughout a facility (such as a warehouse or factory lines) connected by network 106. There can be distributed data processing plants at different locations tied together by network 106.

In operation image capture toolkit 122 enables device camera 120 to capture unprocessed image(s) (hereinafter interchangeably referred to as 'RAW image(s)') of an object using a camera setup in a pre-identified environmental condition. Image capture toolkit 122 seamlessly offers comprehensive camera management control, detects image blur, processes high dynamic range (HDR) imagery, performs automatic image cropping, and ensures the capture of high-quality images (i.e., over a pre-defined pixel resolution) in any image format.

In another embodiment, image capture toolkit 122 may generate first laser beam(s) to scan the object and generate 3D point cloud(s) for the object. The point cloud(s) include information of geometry of the object. Image capture toolkit 122 may further generate RAW image(s) of the object using the information of the geometry of the object derived from the point cloud(s).

In an embodiment, image processing unit 112 receives RAW image(s) of the object and input(s) to categorize the physical object from frontend module 104. The input(s) include metadata of the object including object name, object category, etc. Based on the received input(s), image processing unit 112 attaches the metadata of the object to the RAW image(s) to generate labelled image(s). Image processing unit 112 further determines multiple features from each labelled image. Furthermore, image processing unit 112 determines information contained in each labelled image based on the determined features using ML models 114.

ML models 114 are pre-trained for selection of appropriate features and extracting information from labelled image(s). In some aspects of the present disclosure, image processing unit 112 selects one image from the labeled image(s) of the object based on the information in each labelled image.

Image processing unit 112 further uses physical code toolkit 118 to determine feature density throughout the selected image. In some aspects of the present disclosure, the feature density is associated with a count of features corresponding to each pixel of the labelled image.

In an embodiment, based on the feature density, physical code toolkit 118 determines an analysis area for the object. In some aspects of the present disclosure, physical code toolkit 118 determines multiple segments of pixels (with at least a pre-defined size and at least a pre-defined feature density) from the selected image and selects a segment with the highest feature density as analysis area.

In another embodiment, physical code toolkit 118 determines a feature density distribution from the selected labelled image. Physical code toolkit 118 further segments the selected image into multiple segments/micro areas based on the feature density distribution. Furthermore, physical code toolkit 118 compares the feature density of each segment with a density threshold. Furthermore, physical code toolkit 118 selects segment(s) from the multiple segments having feature density higher than the density threshold and identifies the selected segment(s) as analysis area(s). The density threshold may be different for different objects and may be selected based on the categorization input(s) for the object.

In an exemplary scenario, an object may have feature density distribution higher than the object threshold, which means that the entire surface of the object contains features to be analyzed. In such a case, a portion of selected image capturing the object may be selected as the analysis area.

In response to determination of the analysis area, API 108 generates a trigger signal for frontend module 104 that enables image capture toolkit 122 to capture analysis image of the object using device camera 120. A number of digital images of an object are captured using the device camera 120. An image pertaining to the highest quality is selected. The image selection is based on the image quality.

The analysis image can be smaller in size than the labelled image(s) of the object as it captures a specific area (i.e., the analysis area) of the object in high resolution. In other words, the analysis image covers less area than the labelled image(s). Preferably, the analysis image has a pixel density of at least 800 pixels per inch (ppi).

In some aspects of the present disclosure, image capture toolkit 122 may further generate second laser beam(s) that are relatively denser and more focused (i.e., width of the second laser beam(s) is less than the width of the first laser beam(s)). The second laser beam(s) being reflected by the analysis area of the object are received by image capture toolkit 122 to generate analysis point cloud(s). Image capture toolkit 122 further generates the analysis image using the analysis point cloud(s).

In some aspects of the present disclosure, SDK 124 generates a translucent template (e.g., an Augmented Reality (AR) filter) for the determined analysis area. The translucent template (hereinafter interchangeably referred to as 'template') can be displayed to the user of an application (running through application console 126) in combination with a real-time image feed (such as a video feed) of the object captured by device camera 120. This facilitates the end-user to alter relative alignment of the object with respect to device camera 120 for capturing the analysis image when matching the template. In some other aspects of the present disclosure, the template enables a comparison of a video feed captured by device camera 120 with the required analysis image, and thus facilitates the end-user to navigate device camera 120 to capture analysis image. In some other aspects of the present disclosure, image capture toolkit 122 further generates navigation notification(s) for the end-user. The notification(s) can be displayed to the user via an interface of the user application (i.e., running through application console 126) and enable alignment of device camera 120 and/or the object to capture the analysis image.

In an exemplary scenario, for a batch of identical objects, the analysis area for each object in the batch may be similar, and therefore, one template can be generated for the entire batch of identical objects. In such case, SDK 124 enables transmission of the analysis image to backend module 102 for further processing.

Upon receiving the analysis image, image processing unit 112 uses physical code toolkit 118 to determine a set of features from the analysis image and identifies select feature(s) from the set of analyzed features using ML models 114. The set of features may be a subset of the multiple features. In some aspects of the present disclosure, physical code toolkit 118 generates a physical layer of information (hereinafter interchangeably referred to as 'physical layer') for the object. The term 'physical layer' as used herein is referred to as a set of numerical values corresponding to the set of features determined from the analysis image, that are arranged in accordance with a spatial arrangement of pixels in the analysis image. Physical code toolkit 118 further segments the analysis image into multiple patches/micro areas/micro-surfaces based on multiple select features. Preferably, each patch has at least ten select features of the multiple select features. The micro areas contain unique microstructural parameters and manufacturing footprints recorded in a physical layer. In some aspects of the present disclosure, the multiple patches may be overlapping. In some other aspects of the present disclosure, at least two patches of the multiple patches may overlap. Overlapping of the patches is specific to the presence of a predefined count of the select features in the analysis image that may vary for different physical objects.

In some aspects of the present disclosure, image processing unit 112 may utilize a first pre-trained model from ML models 114 to determine the first set of features from the analysis image. Image processing unit 112 may further use the first pre-trained model to select the set of select features. In some aspects of the present disclosure, image processing unit 112 may utilize a second pre-trained model from ML Model(s) 114 to determine the set of transformation functions. Image processing unit 112 may utilize the second pre-trained model from the ML models 114 to generate the first set of feature-vectors. ML models 114 use a feature extractor (shown in FIG. 3) to analyze an input surface of the object and generate a feature set describing the input surface of the object. The feature set is a one-dimensional feature vector.

ML models 114 process input surfaces of the object by using the feature extractor using a deep neural network. The input surfaces vary in dimensions/sizes. The feature extractor outputs an input surface from among the input surfaces which is uniformly sized with respect to sizes of the other input surfaces. The input surface of the object is divided into a of micro-surfaces and the feature extractor is trained on the micro-surfaces to identify a set of microstructural features of the input surface of the object. The set of microstructural features of the input surface is stored in a database.

Further, the trained feature extractor is applied on surfaces of objects. The surfaces have different dimensions with respect to the dimensions of the input surfaces of the object. The trained feature extractor authenticates query objects by matching microstructural features of the input surface obtained from images of a corresponding query object with the microstructural features of the objects stored in the database. Feature descriptors for the objects are stored in database 116.

Physical code toolkit 118 further assigns weight to each feature of each patch of the multiple patches using the ML models 114. Parallelly, image processing unit 112 generates a transformation function for each patch based on feature(s) in each patch. Furthermore, physical code toolkit 118 generates a feature-vector corresponding to each patch by transforming weighted feature(s) of each patch using the corresponding transformation function. Being dependent on the weighted feature(s) specifically selected for the object, the transformation function changes if any feature in any patch is changed. Therefore, the transformation function and the feature-vector for each patch are immutable. In some aspects of the present disclosure, the template, the analysis image, the feature-vectors, the transformation function(s), and the metadata of the object, in cumulation, generate a code layer of information (hereinafter interchangeably referred to as 'code layer') for the object. Physical code toolkit 118 further generates a physical code for the object based on the code layer.

It must be noted that the functionality of various components of system 100 is presented from the perspective of a single object for illustration. However, the scope of the present disclosure is not limited to it. Typically, the various components of system 100 perform similar functionality for multiple objects and batch(es) of objects as presented hereinabove without deviating from the scope of the present disclosure. In some aspects of the present disclosure, database 116 stores the physical code for each physical object of the multiple objects.

In another embodiment, when a request for authentication or identification of a physical object is generated by frontend module 104, backend module 102 receives categorization input(s) (hereinafter interchangeably referred to as 'inputs for categorization' of the object from frontend 104. Based on the categorization input(s), backend module 102 determines an object type for the object. In response, image processing unit 112 retrieves a first physical code from database 116 corresponding to the input(s) for categorization of the object. The first physical code is generated by physical code toolkit 118 using ML models(s) 114 in a protection phase (i.e., a time of protection of an object by generating a physical code for the object) of the object. Selection of analysis area is also done in protection phase. Based on the first set of select features derived in the protection phase, image processing unit 112 facilitates generation of a second physical code by way of physical code toolkit 118 for the second analysis image.

Moreover, SDK 124 facilitates the image capture toolkit 122 to enable device camera 120 to capture an image of the query object and send a request to API 108 to receive a template indicating the first analysis area of the object. Backend module 102 sends an instruction to the SDK 124 on which first analysis area of the object to focus on. Device camera 120 then captures the same area and creates what is called the second analysis image of the object, which is automatically sent to the backend module 102. Using the image processing unit 112 and physical code toolkit 118, the second physical code is determined from the second analysis image based on the second set of feature-vectors of the object. Based on a comparison of the first and second physical codes, image processing unit 112 verifies the authenticity or identity of the physical object.

In yet another embodiment, when a request for identification of an object from a batch of identical objects is generated by frontend module 104, backend module 102 receives input(s) for categorization of the object from frontend module 104. In response, based on the input(s) for categorization of the object, image processing unit 112 retrieves a batch of physical codes and a template corresponding to the batch of identical objects from database 116. The template is generated by SDK 124 for the batch of identical objects at a time of registering the batch of identical objects. The template for the batch of identical enables frontend module 104 to capture an analysis image that is specific to the object to be identified. SDK 124 further enables capturing a second analysis image. A second physical code is further generated by image processing unit 112 using the second analysis image. The second physical code is then compared with each physical code of the batch of physical codes by image processing unit 112 to verify the identity of the physical object.

In yet another embodiment, for identification of an object, system 100 may construct a tree structure over the physical codes of a batch of identical objects which enables faster comparison of physical codes among physical codes of the batch.

Figure 2:
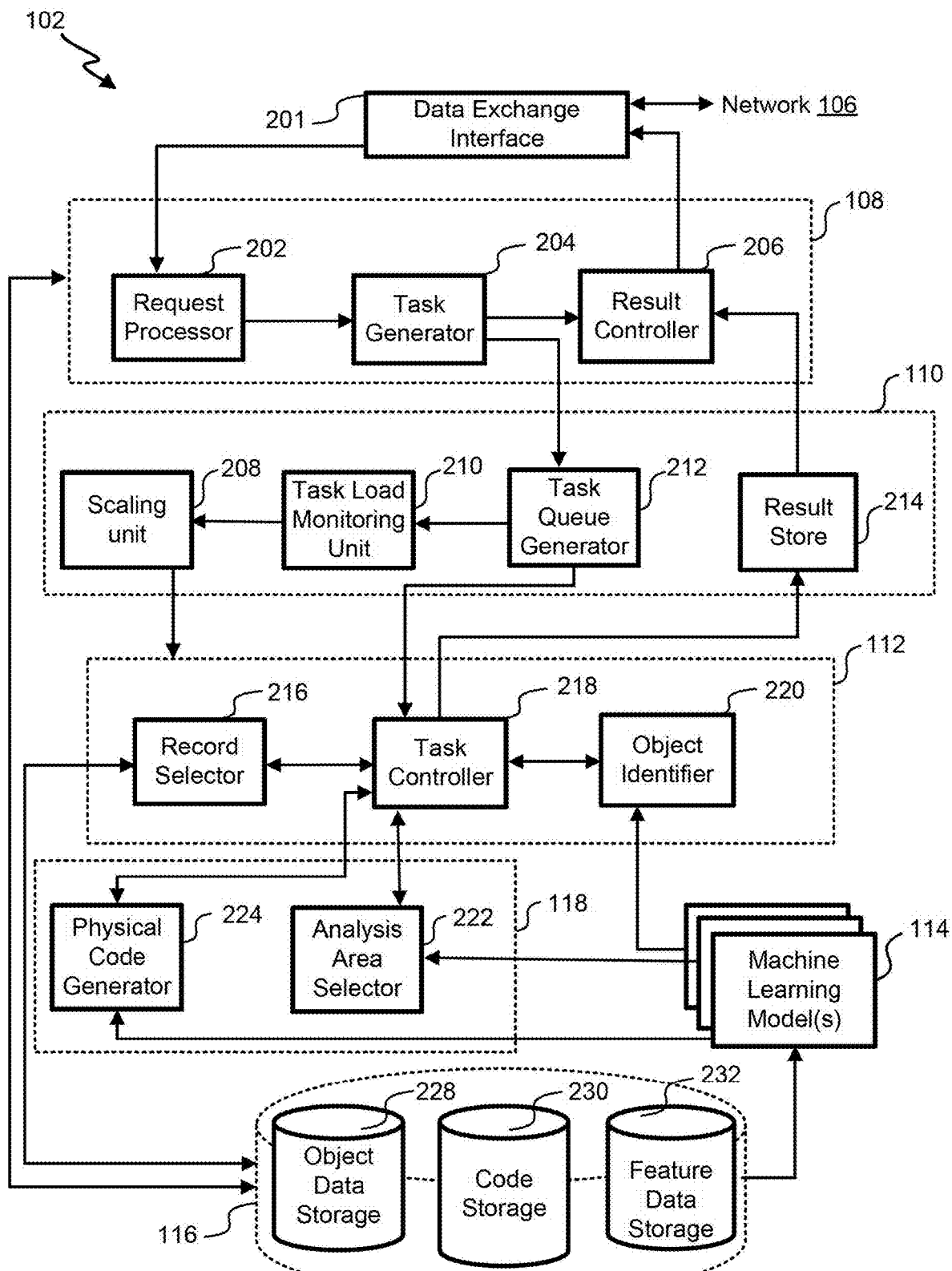
FIG. 2 illustrates a block diagram of a backend module of the system, according to an exemplary embodiment.

FIG. 2 illustrates a block diagram of backend Module 102 according to an exemplary embodiment. Backend module 102 is connected to frontend module 104 through network 106. Network 106 can be the internet, an ethernet cable, or any other connection from camera devices to the computing hardware running the backend module 102.

Backend module 102 and frontend module 104 are securely connected by way of data exchange interface 201. Data exchange interface 201 may include suitable logic, circuitry, interfaces, and/or computer code that may be configured to receive input(s) and transmit output(s) via multiple data ports (not shown). Data exchange interface 201 may further include various input and output (I/O) data ports (not shown) for different I/O devices such that a variety of I/O devices (with different and/or specific requirements and configurations) can be coupled to backend module 102.

As presented in FIG. 1, backend module 102 includes API 108, queuing and scaling unit 110, image processing unit 112, ML models 114, database 116, and physical code toolkit 118. API 108 generates communication protocol(s) for operation of data exchange interface 201 that enables communication between backend module 102 and frontend module 104. Data exchange interface 201 further enables image(s) of the object under observation to be communicated from frontend module 104 to backend module 102. Moreover, data exchange interface 201 enables instruction(s) and/or data (e.g., template for the object, metadata of the object, etc.) to be communicated between backend module 102 and frontend module 104.

API 108 includes request processor 202, task generator 204, and result controller 206. Request processor 202 receives request(s) and/or data from frontend module 104 via data exchange interface 201.

In response to reception of the request(s) and/or data, request processor 202 processes the request(s) and identifies a set of request parameters from each request. In an exemplary scenario, the set of request parameters may correspond to a type of request, criticality of a request, or a combination thereof.

Each processed request along with its request parameter(s) and/or data is passed to task generator 204 for further operations. Task generator 204 generates task(s) for image processing unit 112 concerning the processing of query images corresponding to each request. In some aspects of the present disclosure, task generator 204 associates corresponding request parameters with each task. These tasks may include, for example, finding the first analysis image of an object, calculating (or generating) physical code, storing physical code in the database, comparing one physical code (e.g., the second physical code) with another physical code (e.g., the first physical code) previously stored in the database, generating a result based on the comparison of physical codes etc.

In some aspects of the present disclosure, when task generator 204 identifies more than one task corresponding to a single request, task generator 204 determines a sequential order for execution of each task of the more than one tasks.

The task(s) generated by task generator 204 are further sent to queuing and scaling unit 110 for further operations. A response to each request is generated by backend module 102 and is transmitted to frontend 104 by result controller 206. Result controller 206 further transmits the response (i.e., results) to frontend module 104 via data exchange interface 201.

Queuing and scaling unit 110 includes scaling unit 208, task load monitoring unit 210, task queue generator 212, and result store 214. Task queue generator 212 receives task(s) corresponding to each request from task generator 204. Task queue generator 212 receives task(s) from task generator 204. Queuing and scaling unit 110 stores task(s) in a task queue generated by task queue generator 212. After processing a task, the result(s) for the task is stored in result store 214, from where result controller 206 retrieves the result(s) and communicates the result(s) to frontend module 104. Queuing and scaling unit 110 monitors length of a task queue through task load monitoring unit 210 and dynamically changes a load on image processing units 112 by altering allocation of resources of image processing unit 112 through scaling unit 208, which helps the length of the task queue to be retained below a threshold value.

Image processing unit 112 includes record selector 216, task controller 218, and object identifier 220. Task controller 218 directs record selector 216, object identifier 220, and physical code toolkit 118 to process a task. Task controller 204 selects a task from the queue, identifies a type of the task, and depending on the type of the task (whether it is protection, verification, registration, identification, or searching for a suitable first analysis image) instructs record selector 216 to search the database 116 for corresponding record(s), store records in database 116, instruct physical code toolkit 118, or compare physical codes for confirmation of authenticity or identification of the corresponding record through object identifier 220.

In an exemplary scenario, backend module 102 receives request for authentication, identification, or tamper detection for an object from frontend module 104. The request is received by request processor 202, and a context of the request (in the form of a set of request parameters) is determined. The set of request parameters are further communicated to task generator 204 which generates a plurality of tasks for image processing unit 112. In some aspects of the present disclosure, tasks may enable image processing unit 112 to perform a plurality of operations such as identification of an object type, determination of an analysis area for the object based on the object type, generation of a template based on the identified analysis area that enables frontend module to capture an analysis image of the object, and generation of a first physical code from the analysis image of the object. The plurality of operations may also include retrieval of a second physical code from database 116 based on the input(s) from frontend module 104, comparison of the first physical code with the second physical code, generation of a result based on the comparison of the first and second physical codes, and communication of the result to frontend module 104 via data exchange interface 201.

The tasks are further communicated to task queue generator 212, where a sequence of the tasks to be performed by image processing unit 112 is determined. Task queue generator 212 further generates a task queue based on the sequence of performing tasks by image processing unit 112. The task queue is further communicated to image processing unit 112 where each task from the task queue is sequentially and co-operatively executed by the components of image processing unit 112 (i.e., record selector 216, task controller 218, and object identifier 220) with the support of ML models 114, database 116, and physical code toolkit 118. A result corresponding to each task is stored in result store 214. Result store 214 transmits the result(s) to data exchange interface 201 through result controller 206 so that result(s) can be transmitted to frontend module 104.

ML models 114 are pre-trained on a large dataset of object images for various operations such as classification of objects into object types, selection of feature(s) for each object type, generation of feature vector(s) using selected feature(s), and the like, and thus support image processing unit 112 in its operation. Typically, ML models 114 support determination of unique feature(s) for an object, generation of unique feature vector(s) using the unique feature(s) for the object, and generation of an immutable physical code for the object based on the unique feature vector(s).

Physical code toolkit 118 includes analysis area selector 222 and physical code generator 224. Analysis area selector 222 is configured to search for a suitable position of the analysis image for the input object image. Physical code generator 224 is configured to generate physical code based on the analysis image.

Database 116 may be configured to store data, instructions (or executable codes), and data associated with multiple features. Examples of database 116 may include, but are not limited to, Read-Only Memory (ROM), a Random-Access Memory (RAM), a flash memory, a removable storage drive, a Hard Disk Drive (HDD), a solid-state memory, a magnetic storage drive, a Programmable Read Only Memory (PROM), an Erasable PROM (EPROM), and/or an Electrically EPROM (EEPROM). In some aspects of the present disclosure, database 116 may include an object data storage 228, a code storage 230, and a feature data storage 232. Object data storage 228 may be configured to store data of the multiple objects (such as images, analysis images, feature-vectors, physical layer, code layer, transformation functions, and physical code etc. of each object). Code storage 230 may be configured to store executable instructions, computer codes and/or logic(s) for multiple operations performed by various components of backend module 102.

In some aspects of the present disclosure, backend module 102 may be configured to receive input(s) for categorization of the object. The input(s) for categorization of the object may include metadata of the object. Based on the metadata, image processing unit 112 segregates the data of the multiple objects into multiple categories and/or sub-categories (i.e., an object type). In some aspects of the present disclosure, based on the metadata of the object, image processing unit 112 generates a database filter to select and retrieve data associated with the physical object from database 116. In some aspects of the present disclosure, ML models 114 may support image processing unit 112 to derive information on metadata of the object and/or segregate the data of the multiple objects.

Backend module 102 may further be configured to receive RAW image(s) of the object from frontend module 104. Image processing unit 112 may further determine a set of selected parameters specific to the object based on the metadata of the object using ML models 114. Preferably, the set of selected parameters includes first and second sets of parameters for the physical object. Each parameter in the first set of parameters corresponds to information associated with a structure of material of the physical object, and each parameter in the second set of parameters corresponds to information associated with the process of manufacturing the physical object.

In some aspects of the present disclosure, the set of parameters may be associated with micro-structural feature(s) present on the surface of the object and production footprint(s) of the object. For example, when the object to be identified and/or authenticated is a fur coat, the set of parameters may include the length of fur, color gradient of fur, material textures on a fiber attached to the fur, and the like.

In another example, when the object is an automobile gear, the set of parameters may include properties of the material surface of the gear, grooves, or texture(s) on a surface of the gear, and the like. ML models 114 may determine multiple features for the physical object based on the set of parameters (that are specific to the category of the object).

In some aspects of the present disclosure, ML models 114 may be configured as a Convolutional Neural Network (CNN) with multiple feature filters (such as specific feature masks) and pooling layer(s) aligned prior to an Artificial Neural Network (ANN). Each feature filter is associated with one feature of the determined multiple features. Image processing unit 112 may determine information from each feature of the multiple features by iteratively training the CNN with a number of image samples captured for the object (i.e., positive training) and a number of image samples captured for other objects (i.e., negative training). Based on the iterative training, CNN may determine information associated with each feature of the multiple features and assign a weight for each feature filter. CNN may further generate an information score for each feature of the multiple features based on the weight assigned to each feature. Furthermore, CNN may identify a set of features from the multiple features of the object having information score higher than first information threshold.

In an embodiment, task controller 218 instructs analysis area selector 222 to determine the set of features from each RAW image. In response, analysis area selector 222 may determine information in each image based on the associated set of features. Moreover, analysis area selector 222 may select one RAW image for determination of analysis area for the object. In some aspects of the present disclosure, the selected RAW image may have the highest information of the object. In some other aspects of the present disclosure, the selected RAW image (hereinafter interchangeably referred to as 'RAW image') may have the highest count of feature(s) with an information score higher than the first information threshold.

In some other aspects of the present disclosure, backend module 102 may further be supported by external sensor(s) (not shown) to detect a set of physical parameters of the object such as density of the object, weight of the object, conductivity of the object, etc. Image processing unit 112 may further update the set of features by combining the set of physical parameters of the object with the first and second sets of parameters.

In some aspects of the present disclosure, analysis area selector 222 further determines feature density of the set of features in the RAW image. Moreover, analysis area selector 222 generates multiple segments corresponding to the RAW image by segmentation of pixels of the RAW image based on the feature density. In some aspects of the present disclosure, ML models 114 may support analysis area selector 222 to generate the multiple segments using data segmentation technique(s). Each segment of the multiple segments may have at least a pre-defined size and at least a pre-defined feature density.

Analysis area selector 222 may further identify a set of select features from the set of features having information score higher than a second information threshold which is higher than the first information threshold. The set of select features may be unique features specific to the object. Analysis area selector 222 may further identify segment(s) from multiple segments, having at least a pre-defined count of select features. Furthermore, analysis area selector 222 may identify a segment of the selected segments as an analysis area for the object. In some aspects of the present disclosure, the analysis area may have the highest count of select features. In some other aspects of the present disclosure, the analysis area may have the highest information compared to other selected patches.

In some other aspects of the present disclosure, analysis area selector 222 may compare the count of select features with the pre-defined count of select features. In an exemplary scenario, when multiple segments have a count of selected features more than the pre-defined count of select features, analysis area selector 222 may generate multiple analysis areas, one corresponding to each segment. Analysis area selector 222 may further determine a bounding box (i.e., a boundary enclosing the multiple analysis areas) and may select the bounding box as the analysis area of the object. In some aspects of the present disclosure analysis area selector 222 may utilize the ML models 114 to determine the bounding box.

In another exemplary scenario, when the object has feature density higher than the object threshold (i.e., select features are present throughout the object), analysis area selector 222 may determine the bounding box enclosing the entire object in the image(s) as the analysis area.

Image processing unit 112 is configured to receive the analysis image from frontend module 104 and determine values of the set of features present in the analysis image (hereinafter interchangeably referred as 'feature values') and values of the set of select features (hereinafter interchangeably referred to as 'select feature values') from the analysis image. Moreover, image processing unit 112 sends the feature values and the select feature values to physical code generator 224.

Physical code generator 224 generates a physical layer of information for the object based on the feature values. In some aspects of the present disclosure, physical code generator 224 arranges the feature values based on their spatial occurrence in the analysis image. Based on the select values, physical code generator 224 segregates the physical layer into multiple patches. In an exemplary scenario, each patch may have a length of at least 0.5 centimeter (cm) and a width of at least 0.5 centimeter (cm). In an exemplary scenario, each patch of the multiple patches may have at least ten select features. Physical code generator 224 further generates a context score for each feature based on the feature values in each patch.

In some aspects of the present disclosure, the set of select features may be selected based on a voting mechanism. Image processing unit 112 may verify the information score of each feature of the set of features based on voting for each feature for the information score. In some aspects of the present disclosure, with addition of training data of a new object, image processing unit 112 may re-calculate the information score for each feature of the set of features. Image processing unit 112 may further re-identify the select feature(s) based on the re-calculated information score.

In some aspects of the present disclosure, the physical code generator determines a pattern of features from each patch based on the feature values. Physical code generator 224 further compares the pattern of features in each patch with other patterns of features in the other patches. Furthermore, physical code generator 224 identifies unique portion(s) in each pattern of features and determines information associated with each pattern using ML models 114. Based on the information associated with each unique pattern, physical code generator 224 assigns weight to each feature.

Physical code generator 224 further generates the context score for each feature based on the assigned weight. In an exemplary scenario, physical code generator 224 may utilize a CNN with multiple pattern filters (i.e., masks) and pooling layer(s) aligned prior to an Artificial Neural Network. Each pattern filter is associated with one pattern of the multiple patterns in the physical layer. CNN is iteratively trained to determine an impact on the information (i.e., context of a feature) for assigning a weight to each feature of the subset of features.

Based on the context score and feature(s) present in each patch of the multiple patches, the physical code generator 224 determines a transformation function for each patch. Physical code generator 224 further generates a feature-vector for each patch based on a transformation of the feature(s) of each patch using the associated transformation function. Physical code generator 224 further combines the analysis image, metadata of the object, template of the object, and the set of feature-vectors to generate a code layer of information for the object. Furthermore, physical code generator 224 generates a physical code for the object using the code layer. In some aspects of the present disclosure, physical code generator 224 generates the physical code from the code layer using a hash function. In some other aspects of the present disclosure, the physical code may be generated using the set of feature-vectors for the object. The physical code generated at the time of an item's protection is stored in database 116.

For verification, authentication, or tamper detection for the object, the second physical code (i.e., generated by physical code generator 224 in response to a request to verify identity, authenticity, or tamper detection) is compared with first physical code (i.e., stored in database 116). Object identifier 220 may retrieve the first physical code from database 116 and may compare the first physical code with the generated second physical code. Based on the comparison, object identifier 220 may generate a matching score. Object identifier 220 may further verify identity, authenticity, or tamper of the object based on the matching score.

In another aspect of the present disclosure, object identifier 220 retrieves a second code layer from the second physical code (i.e., generated based on the request) and a first code layer from the first physical code (i.e., retrieved from database 116). Object identifier 220 further extracts a first set of functions (hereinafter interchangeably referred as 'first set of immutable fibers') from the first code layer and a second set of functions (hereinafter interchangeably referred to as 'second set of immutable fibers') from the second code layer. Furthermore, object identifier 220 compares the first and second sets of immutable fibers. Based on the comparison, object identifier 220 identifies matching and mismatching immutable fibers. Object identifier 220 generates the matching score based on a count of matching and mismatching immutable fibers.

In some aspects of the present disclosure, when the matching score is greater than a first matching threshold, object identifier 220 generates a notification for authenticity verification of the object. When the matching score is less than the first matching threshold and greater than a second matching threshold, the object identifier generates a notification for tamper detection on the object, and when the matching score is less than the second matching threshold, the object identifier generates a notification for identification of the counterfeit object.

Figure 3:
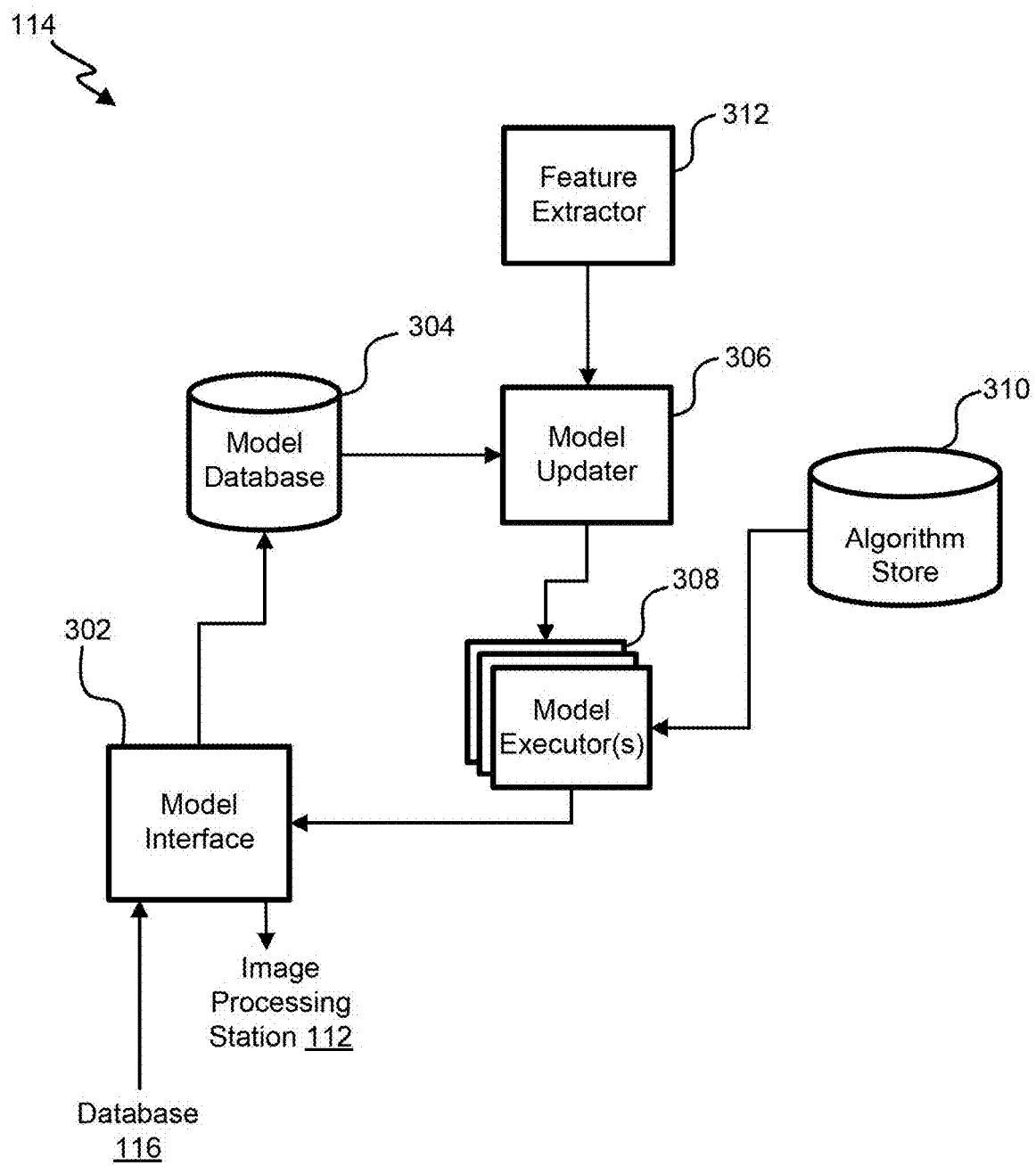
FIG. 3 depicts an operational architecture of machine learning (ML) model of the backend module, according to an exemplary embodiment.

FIG. 3 depicts an operational architecture of ML models 114 in backend module 102, according to an exemplary embodiment. ML models 114 may include a model interface 302, a model database 304, a model updater 306, a model executor 308, an algorithm store 310, and a feature extractor 312.

Model interface 302 receives training data (e.g., features, feature-vectors, object images, and instruction(s)) from feature extractor 312 based on the functionality of various components of image processing unit 112. Feature extractor 312 processes surfaces of objects using a deep neural network to output a surface which is uniformly sized with respect to sizes of the other surfaces to model interface 302. The surface is divided into multiple micro-surfaces. Feature vector 312 identifies microstructural features from the micro-surfaces of the objects and determines a feature set corresponding to the respective object. Feature vector 312 determines feature(s) or microstructural feature(s) from the surface of the object, generates feature vector(s) using the microstructural feature(s) for the object. The feature vector(s) is used to generate an immutable physical code for the object.

Feature extractor 312 filters microstructural features to select the microstructural features having maximum inclusion in the input surfaces of the object so that useful microstructural features are included in the analysis and matching.

In an embodiment, feature extractor 312 is based on a convolutional neural network. A pooling layer of the feature extractor is one of: an average pooling layer in a neural network, a global maximum pooling layer in the neural network, a global sum pooling layer in the neural network or a global generalized mean pooling layer in the neural network.

In another embodiment, feature extractor 312 provides a feature set describing the input surface of the object, and the feature set is a one-dimensional feature vector.

Model interface 302 further sends model-generated output(s) (such as weights assigned to features) to backend module 102. Model interface 302 further receives feedback data from backend module 102 and transmits the feedback data to model database 304. Model updater 306 further accesses the feedback data to update parameter(s) (such as weights, bias, number of layers, filters, pooling type etc.) of ML models 114 for training specific to an object of the multiple objects. Additionally, model interface 302 receives the instruction data from backend module 102 and transmits classified information to image processing unit 112.

Model database 304 stores neural networks, weights of neurons for the neural networks, input data for the neural networks, output data from the neural networks, and the like.

Additionally, model database 304 transmits a neural network from the stored neural networks to model updater 306. Model database 304 further sends the feedback data to model updater 306. Based on the feedback data, model updater 306 updates the parameters of ML model for customized training specific to each object.

Model executor 308 receives data from model updater 306 that includes a customized training regimen specific to each object and the feedback data. Based on the data received from model updater 306, model executor 308 retrieves ML algorithms from algorithm store 310 to perform an operation for image processing unit 112.

In some aspects of the present disclosure, model executor 308 transmits indication of a machine learning algorithm to algorithm store 310. Algorithm store 310 stores multiple machine learning algorithms. Based on the indication, algorithm store 310 transmits the corresponding machine learning algorithm from the multiple machine learning algorithms.

Figure 4:
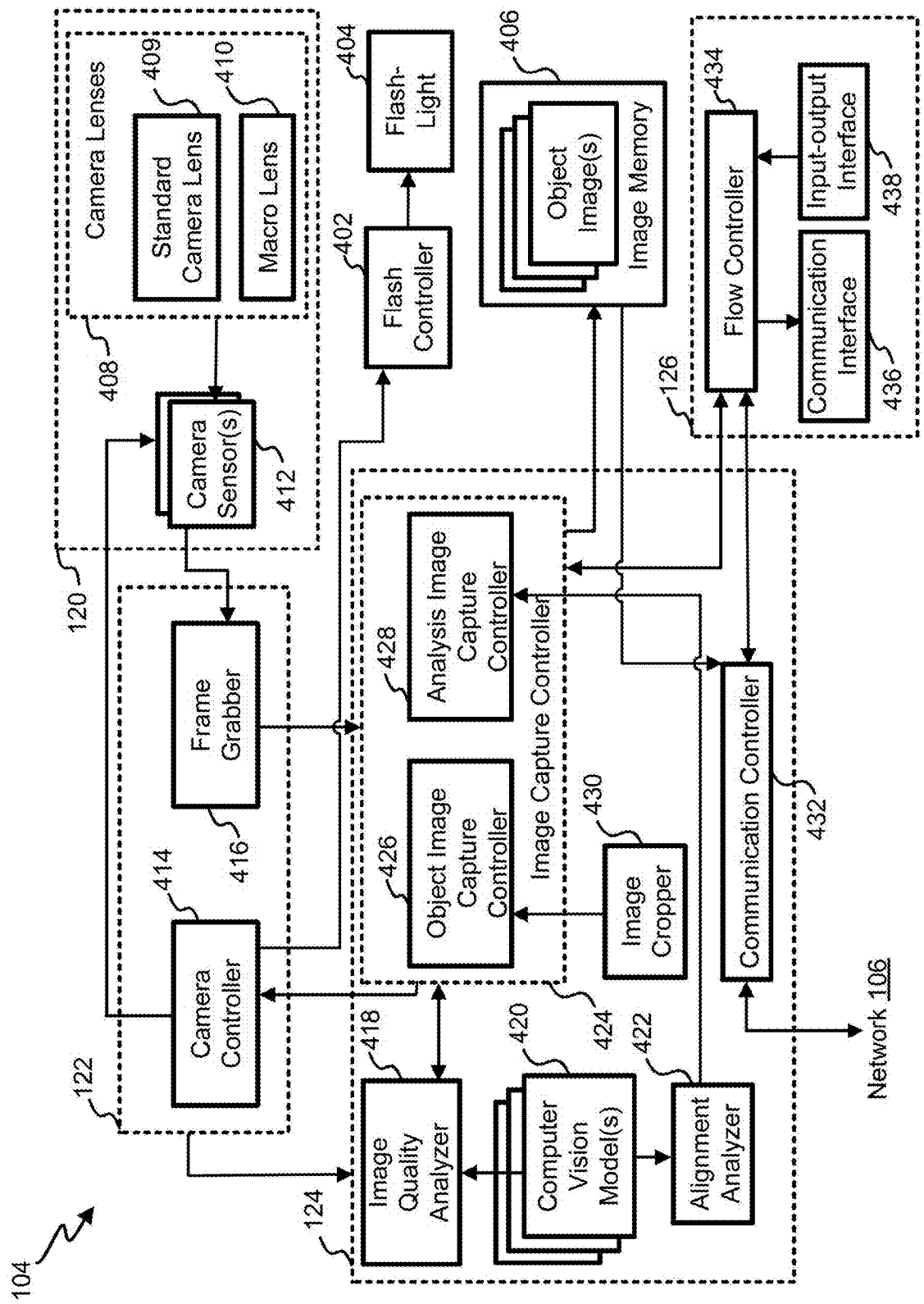
FIG. 4 illustrates a block diagram of a frontend module of the system, according to an exemplary embodiment.

FIG. 4 is a block diagram depicting frontend module 104 according to an exemplary embodiment. Frontend module 104 is either embedded, coupled, or integrated with a user device operated by an end-user (e.g., an organization and/or an individual). As presented in FIG. 1, frontend module 104 includes device camera 120, image capture toolkit 122, SDK 124, and user application condole 126. Various components of frontend module 104 may be communicatively coupled with each other by way of one or more wired and/or wireless means.

Device camera 120 can be an industrial camera, smartphone camera, scanner, Vision Pro, robotic automatic line with a camera, or any other camera, that can capture standard and macro images of object in high pixel resolution. These images can be communicated to backend module 102 for identification, authentication, or tamper detection on an object. Device camera 120 is configured to capture images (e.g., RAW images) of the object. In some aspects of the present disclosure, device camera 120 may include camera lenses 408 and camera sensor(s) 412. Particularly, camera lenses 408 includes standard camera lens 409 and macro lens 410. Co-operative operation of camera sensor(s) 412 with standard camera lens 409 enables device camera 120 to capture standard images covering (or capturing) the entire object. Similarly, co-operative operation of camera sensor(s) 412 with macro lens 410 enables device camera 120 to capture macro images of the object. Macro images of the object may be focused on a portion of the object (such as its analysis area). The image(s) captured by device camera 120 are standardized in terms of a set of image parameters such as exposure, illumination, aspect ratio, etc. Camera sensor(s) 412 are configured for capturing the images with a standard quality in terms of the set of image parameters.

Frontend module 104 is further equipped with flash-light 404 and flash controller 402 to match the standard quality in terms of illumination on the object. In some aspects of the present disclosure, flash controller 402 controls operation(s) of flash-light 404 (such as ON/OFF, illumination brightness of flash-light 404, duration of illumination of flash-light 404, etc.).

Control over device camera 120 and flash-light 404 is managed by the image capture toolkit 122. In some aspects of the present disclosure, image capture toolkit 122 includes camera controller 414 and frame grabber 416. Camera controller 414 controls configuration setting(s) of camera sensor 412 and flash-light 404. These settings can dynamically change during operation based on analysis of the obtained photos. Frame Grabber 416 is responsible for capturing photos.

In some aspects of the present disclosure, image capture toolkit 122 enables device camera 120 to capture a live image feed (e.g., live video feed). Image capture toolkit 122 is further coupled to SDK 124 and communicates the images (or frames) of the live image feed to SDK 124 for further processing. In some aspects of the present disclosure, SDK 124 is responsible for capturing images (such as image(s) of the entire object and/or the first and second analysis images)

in the standard quality (i.e., in terms of the set of image parameters) for tasks to be processed at backend module 102. According to an exemplary embodiment, SDK 124 includes image quality analyzer 418, alignment analyzer 422, image capture controller 424, and communication controller 432. Image quality analyzer 418 and alignment analyzer 422 are supported by computer vision model(s) 420 that may be either integral to SDK 124 or externally supporting frontend module 104. Image cropper 430 may be coupled with image capture controller 424 and may facilitate image capture controller 424 with a control on the aspect ratio of image(s) captured by device camera 120. Image quality analyzer 418 checks the quality of image(s) and can dynamically change configuration setting(s) of device camera 120 and flash-light 404 by way of image capture toolkit 122.

In some aspects of the present disclosure, SDK 124 is also responsible for generating a template corresponding to the analysis area of the object. SDK 124 may further compare the analysis area with a real-time image feed (e.g., a live video feed) to assist a user to capture an analysis image of the object for further processing. In an exemplary scenario, the template can be a bounding box that compares the analysis area with the real-time image feed. The bounding box may represent a match and/or a mismatch of the analysis area with the real-time image feed by changing the color of the bounding box. In another exemplary scenario, the template can be a translucent AR filter for the analysis area. The translucent AR filter can be displayed to the user, overlapping the real-time image feed that directs the user to alter alignment of the object to capture the analysis image. Preferably, the analysis image is captured using a camera with a pixel resolution of at least 800 pixels per inch (ppi). In another exemplary scenario, the template can be navigation notification(s). In such a scenario, SDK 124 is supported by computer vision model(s) 420 to determine the relative position of the object with respect to a camera sending the real-time image feed.

In some aspects of the present disclosure, computer vision model(s) 420 determines a noise level in each frame. When the determined noise level is higher than a noise threshold value (that may be due to insufficient illumination on the object), image quality analyzer 418 instructs image capture toolkit 122 to enable (or turn 'ON') flash-light 404. In response, image capture toolkit 122 triggers flash controller 402 to turn on flash-light 404. In some other aspects of the present disclosure, computer vision model(s) 420 further communicates information of noise level in the live feed to image capture toolkit 122, based on which flash controller 402 controls illumination intensity of flash-light 404.

Image capture controller 424 includes object image capture controller 426 and analysis image capture controller 428. Image quality analyzer 418 performs analysis on the live image feed to determine quality of image (live image feed frame) to determine information of quality of each frame. This information of quality of each frame is communicated to object image capture controller 426. Object image capture controller 426 determines a quality score of each image. When the quality score of the image (live image feed frame) is higher than a quality threshold, object image capture controller 426 instructs the camera controller 414 to enable device camera 120 to capture a frame.

Computer vision model(s) 420 further supports alignment analyzer to identify alignment of object in line with the template of the object communicated by backend module 102. In some aspects of the present disclosure, alignment analyzer 422 compares the live image feed with the template in real time. Based on the comparison, alignment analyzer 422 generates a dynamic matching score for the live frame. In some aspects of the present disclosure, when the matching score is less than a matching threshold value, alignment analyzer 422 may further generates dynamic instruction(s) to re-align the object with respect to device camera 120 unless the matching score exceeds the matching threshold value. The instruction(s) to re-align the object may include instructions to move the object, device camera 120, or both, and can be displayed (or presented) to the end-user through input-output interface 438.

Image cropper 430 allows automatically or manually cropping the obtained image to match the standard form. Alignment analyzer 422 checks how well the camera is aligned with the correct position to capture the first/second analysis image. The Alignment analyzer 422 also guides the end-user to this correct position, for example, through an Augmented Reality component, which may generate an attachment or embodiment of SDK 124. Additionally, SDK 124 includes communication controller 432 which ensures communication with the backend module 102.

SDK 124 contains the basic building blocks and components through which the end-user can configure the user application running through application console 126. User flow of the application is defined using flow controller 434. Flow Controller 434 can receive inputs manually from the user or automatically through the camera. Communication with the end-user is ensured by the communication interface 432.

Figure 5:
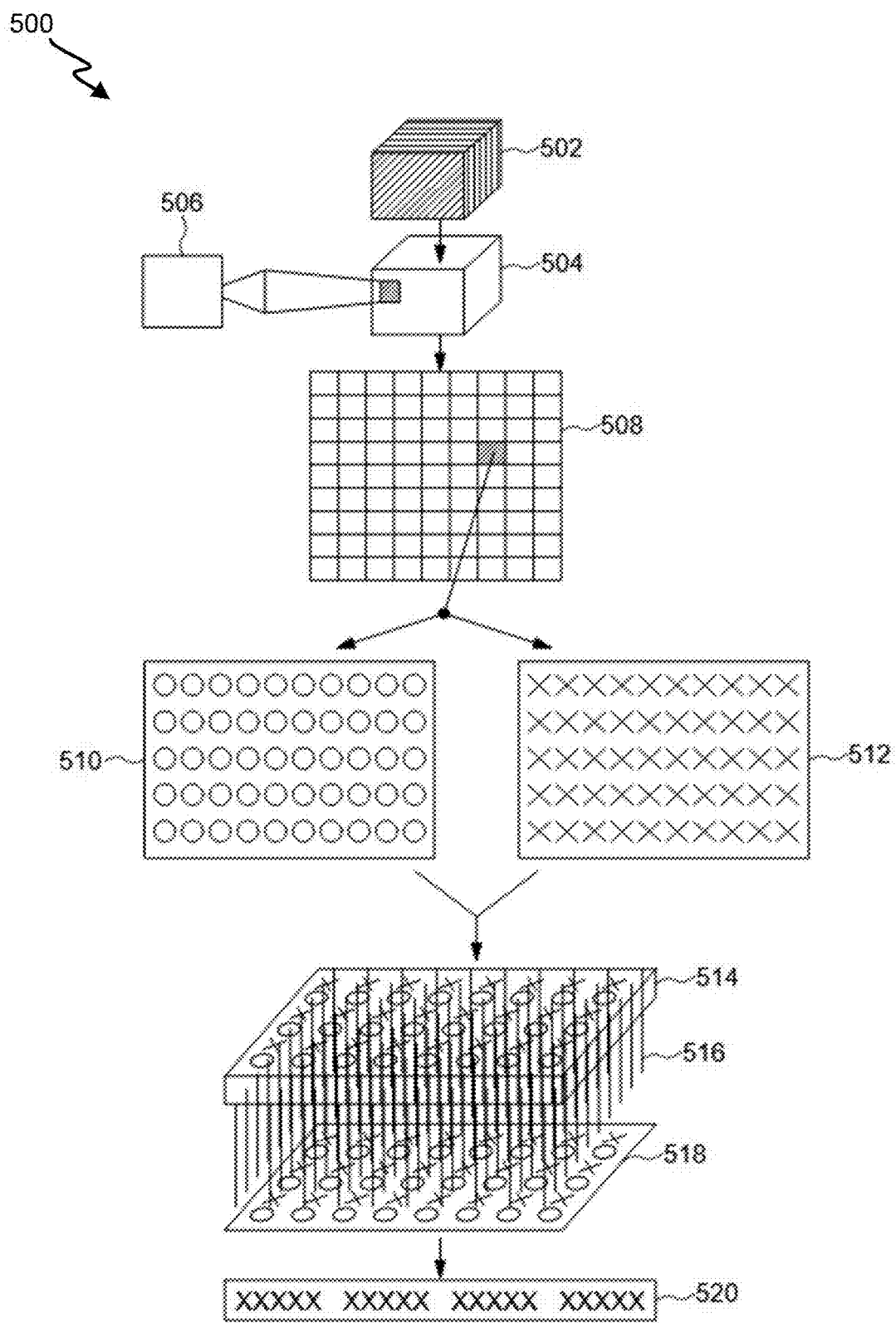
FIG. 5 is a process flow diagram that depicts generation of a physical code, according to an embodiment.

FIG. 5 is a process flow diagram that depicts a process 500 for the generation of a physical code, according to an embodiment. In some configurations, FIG. 5 refers to multiple images of a physical object, a selected image from the multiple images, an analysis area, multiple patches of the selected image, a set of microstructural parameters, and a set of distinctive manufacturing footprints, a physical layer of information for the physical object, a code layer of information for the physical object, multiple immutable fibers, and a physical code for the physical object.

In process 502, image(s) of the physical object and the analysis areas are captured with different materials and shapes, by using different cameras and devices, in different lighting conditions, and different alignments of the object.

In process 504, one image of the image(s) is selected by the backend module 102 based on best quality of the image(s).

In process 506 a focus area from the selected image is identified using machine learning algorithms. The focus area is auto-selected based on one or more characteristics of the physical object. In some aspects of the present disclosure, a feature density is determined from the selected image and the analysis area is selected based on the feature density. Specifically, the selected image may be segmented into multiple segments (with a pre-defined specification) based on the feature density and a segment of the multiple segments is selected as the analysis area.

In process 508, an analysis image is captured corresponding to the analysis area. In some aspects of the present disclosure, the analysis image is captured based on a template of the object. The analysis image is further segregated into a plurality of micro areas or micro-surfaces or patches containing unique microstructural parameters and manufacturing footprints. Each micro-area may have at least a pre-defined size and at least a pre-defined count of select features. The unique microstructural parameters and manufacturing footprints are recorded in a physical layer.

In process 510, the first set of features that are associated with the set of microstructural parameters are determined from each patch. The first set of features include unique microstructural parameters.

In process 512, the second set of features that are associated with the set of distinctive manufacturing footprints are determined from each patch. The second set of features includes manufacturing footprints.

In process 514, the physical layer of information is generated using the first and second set of features. The physical layer has the first and second sets of features combined for each pixel.

In process 516, one immutable fiber is generated for each patch. The immutable fiber corresponds to a transformation function for each patch, that is dependent on the first and second sets of features in each patch.

In process 518, a set of feature-vectors are generated from the physical layer based on the immutable fibers. Moreover, a code layer of information is generated based on the physical layer and the immutable fibers. In some aspects of the present disclosure, the code layer includes the template, the analysis image, metadata, and feature-vectors associated with the object.

In process 520, a physical code is generated using the code layer. In some aspects of the present disclosure, the physical code may be generated from the code layer using a hash function.

Figure 6A:
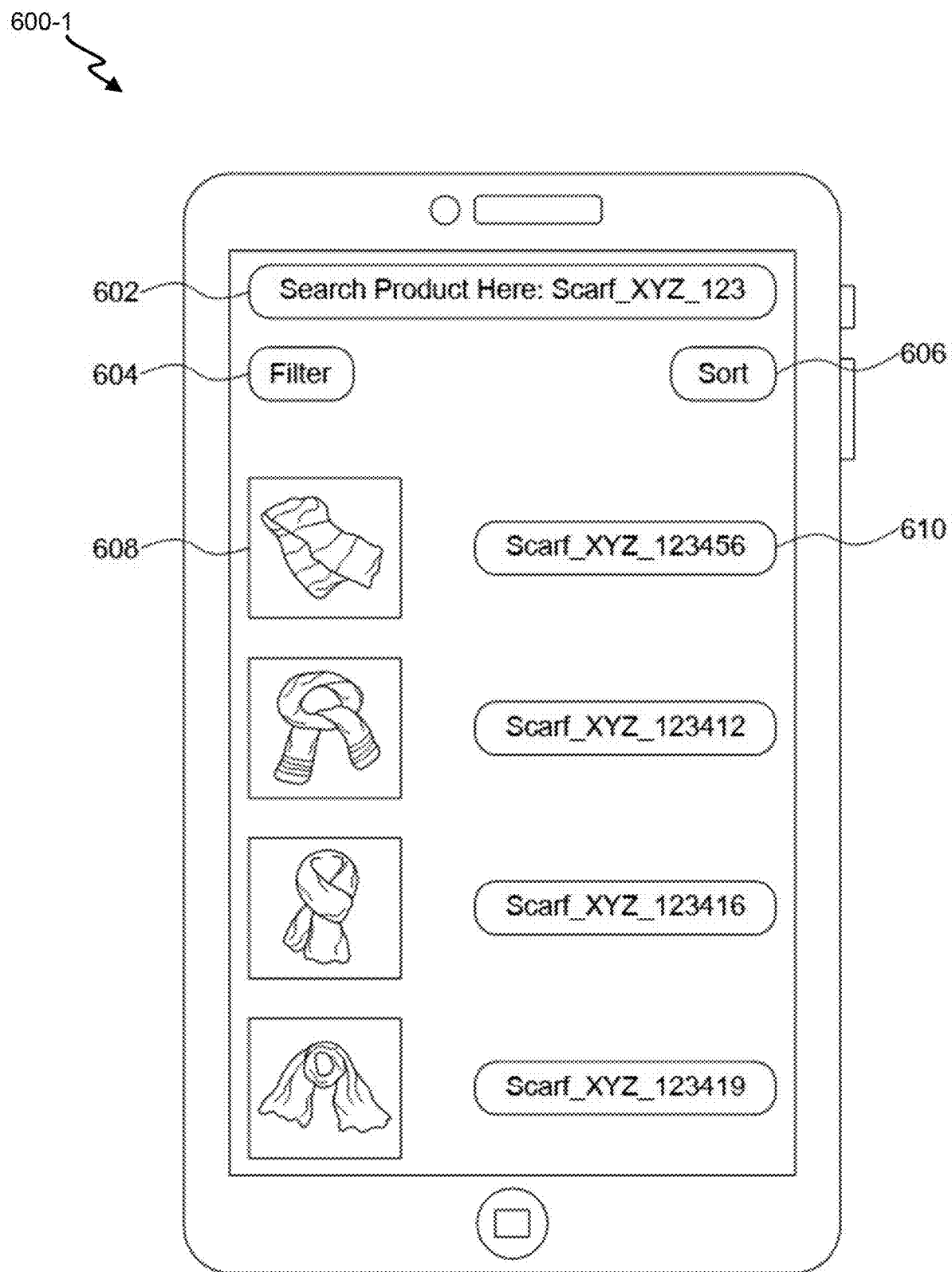
FIGS. 6A-6B illustrate example embodiments of an application interface generated by the system.

FIG. 6A illustrates an example embodiment of an application interface 600-1 generated by system 100. Application interface 600-1 is a computer-generated application associated with operation(s) of image processing unit 112 of backend module 102. The application is hosted by application console 126 and displayed to the user of frontend module 104 on input-output interface 438. Application interface 600-1 includes elements 602-610.

Element 602 indicates an option to categorize a physical object. Element 602 enables the user of frontend module 104 to provide specific details (such as metadata) of the object.

Element 604 indicates an option to filter a category of physical objects. Element 604 enables the user of frontend module 104 to provide input(s) for selection of a category or type of object.

Element 606 indicates an option to sort results displayed on application interface 600-1 by backend module 102 based on pre-defined filter(s) (e.g., sort by relevance, price, rating, date, etc.). Element 606 enables the user of frontend module 104 to provide input(s) to sort the results based on the selected filter.

Element 608 indicates an object displayed on application interface 600-1 based on the input(s) provided by the user of frontend module 104 in elements 602, 604, or 606.

Element 610 indicates an identifier (such as a name tag) associated with the object displayed at element 608.

In some aspects of the present disclosure, each element of elements 602-610 are selectable by the user of frontend module 104, and upon selection of element 608 or element 610, after input(s) provided to elements 602, 604, or 606, the application renders another application interface on input-output interface 438.

Figure 6B:
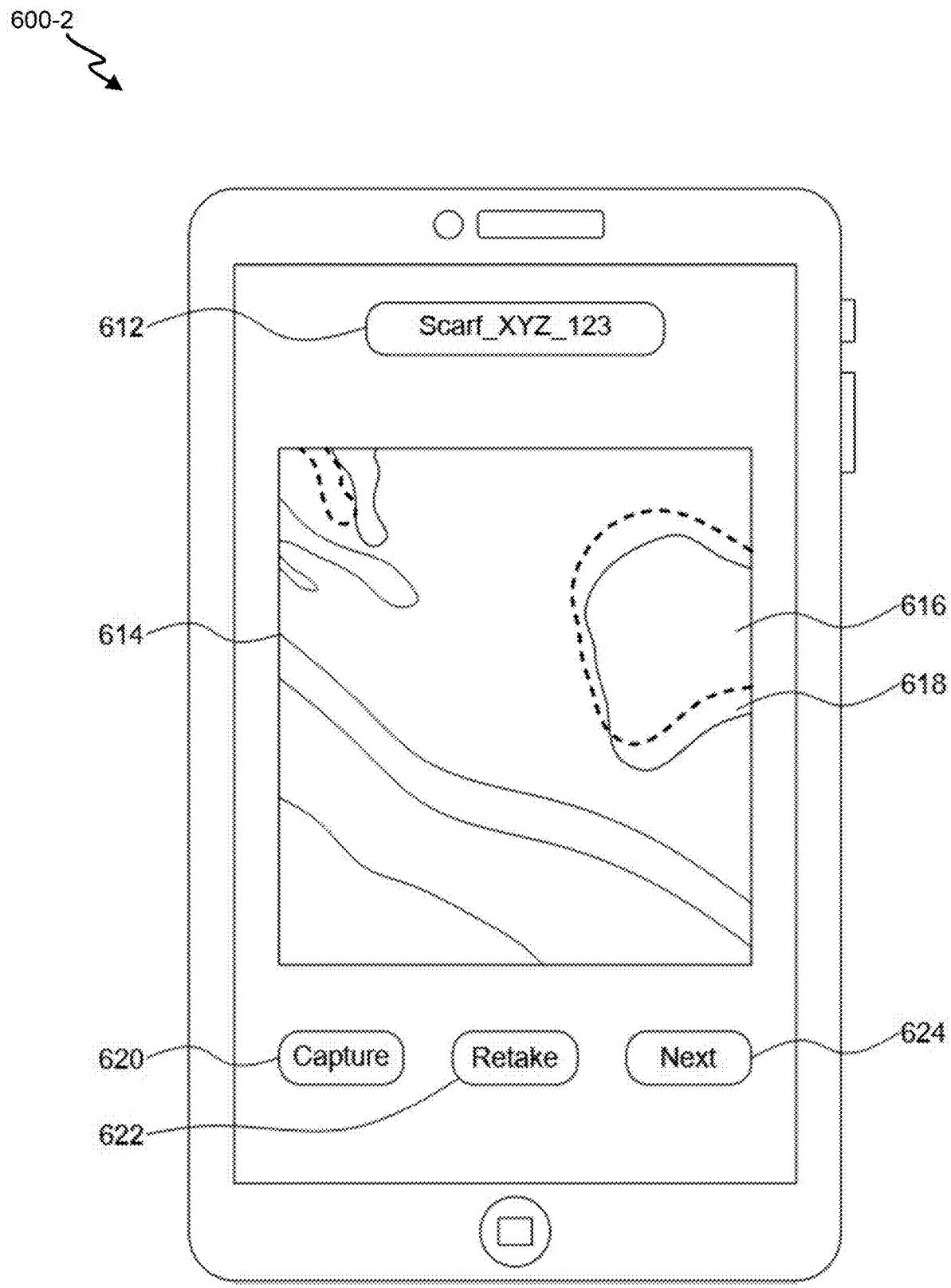

FIG. 6B illustrates an example embodiment of an application interface 600-2 generated by system 100. Application interface 600-2 is a computer-generated application associated with operation(s) of image processing unit 112 of backend module 102. The application is hosted by application console 126 and displayed to the user of frontend module 104 on input-output interface 438. Application interface 600-2 includes elements 612-624.

Element 612 indicates an identifier (such as the name tag) associated with an object selected by the user of frontend module 104. Element 602 enables the user of frontend module 104 to view the identifier associated with the selected object.

Element 614 indicates a template corresponding to the analysis image for the selected object.

Element 616 indicates a feature of the template selected by the end-user of frontend module 104. Element 616 enables the user of frontend module 104 to change the alignment of the user device to capture an analysis image.

Element 618 indicates a feature of the video feed captured by frontend module 104. Element 618 enables the user of frontend module 104 to adjust the alignment of the user device based on a visual comparison of the template presented in element 616 and the video feed presented in element 618.

Element 620 indicates an option to capture an analysis image for the selected object. Element 620 enables the user of frontend module 104 to capture the analysis image of the selected object when the video feed in element 618 matches with the template in element 616.

Element 622 indicates an option to recapture (or retake) the analysis image. Element 622 enables the user of frontend module 104 to re-capture the analysis image when the analysis image is captured mismatching the template.

Element 624 indicates an option to submit the analysis image for further processing. Element 624 enables the user of frontend module 104 to confirm a selection of the analysis image.

In some aspects of the present disclosure, and upon selection of element 624 after element 620 or element 622, the application renders another application interface on input-output interface 438.

Figure 7:
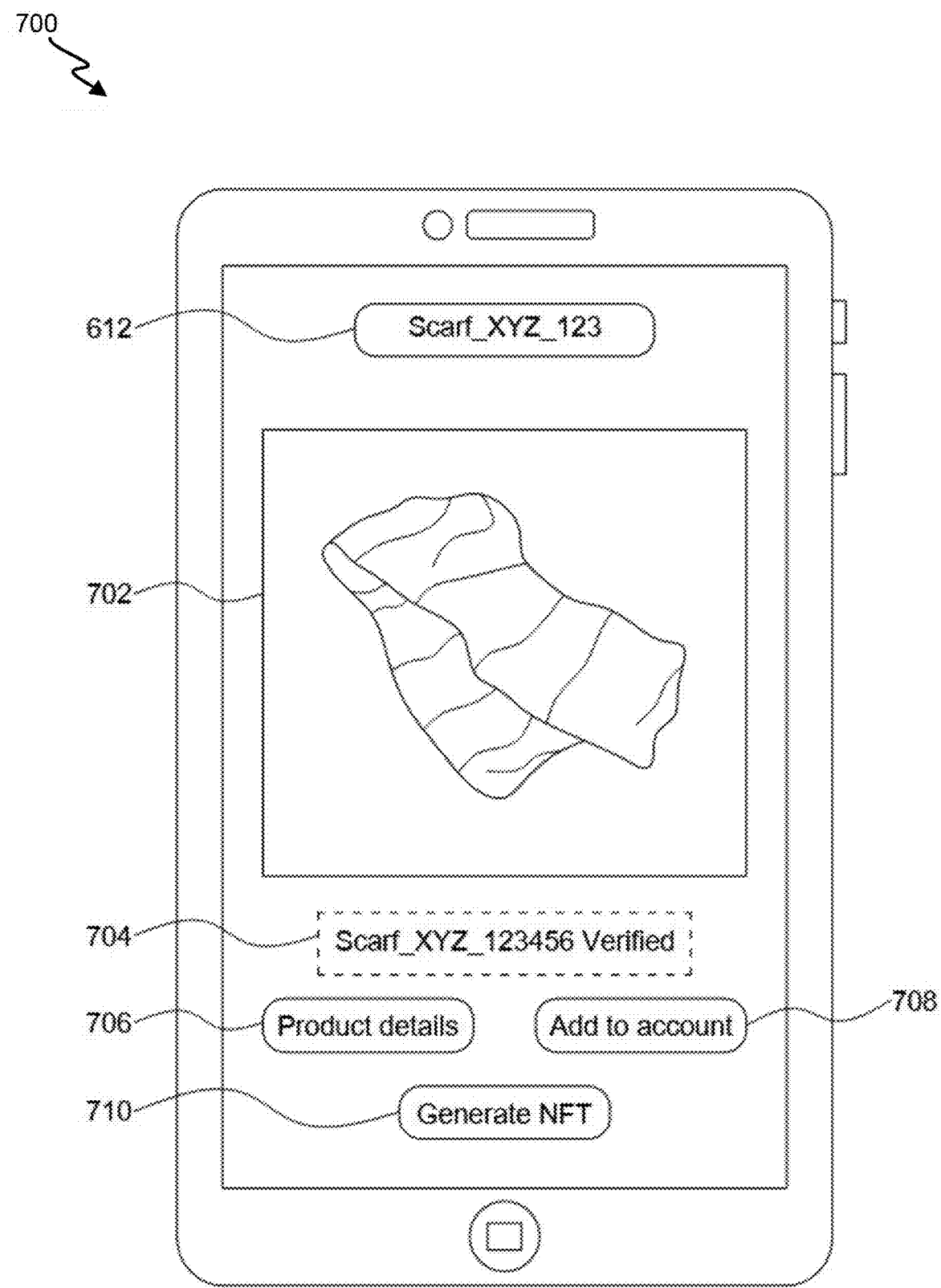
FIG. 7 illustrates an example embodiment of an application interface generated by the system.

FIG. 7 illustrates an example embodiment of an application interface 700 generated by system 100. Application interface 700 is a computer-generated application associated with operation(s) of image processing unit 112 of backend module 102. The application is hosted by application console 126 and displayed to the user of frontend module 104 on input-output interface 438. Application interface 700 includes elements 612, 702-710.

Element 702 indicates an identified object based on the captured analysis image. Element 702 enables the user of the user device to view an object identified by the backend module 102 corresponding to the analysis image captured by frontend module 104.

Element 704 indicates a status of authenticity of the object based on the analysis image. Element 704 enables the user of frontend module 104 to view the status of authenticity of the selected object based on the analysis image.

Element 706 indicates an option to view details (such as metadata, image(s), or specifications of the object stored in database 116). Element 706 enables the user of frontend module 104 to view details associated with the object stored in database 116.

Element 708 indicates an option to add the product to a digital account associated with the user of frontend module 104. Element 708 enables the user to add the verified product to be added as a digital asset to the digital account of the user of frontend module 104. This facilitates the user of the user device hosting frontend module 104 to revisit anytime later and access details of the digital asset(s) owned by the user of frontend module 104.

Element 710 indicates an option to generate a Non-Fungible Token or any decentralized token (NFT) for the verified object, that can be stored in the digital account of the user. The NFT may include the product details of the object stored in database 116 in an encrypted form. Element 710 enables the user of frontend module 104 to generate the NFT corresponding to the verified product that can be accessed anytime later.

In some aspects of the present disclosure, and upon selection of elements 708 or 710, the application renders another application interface on input-output interface 438.

Figure 8A:
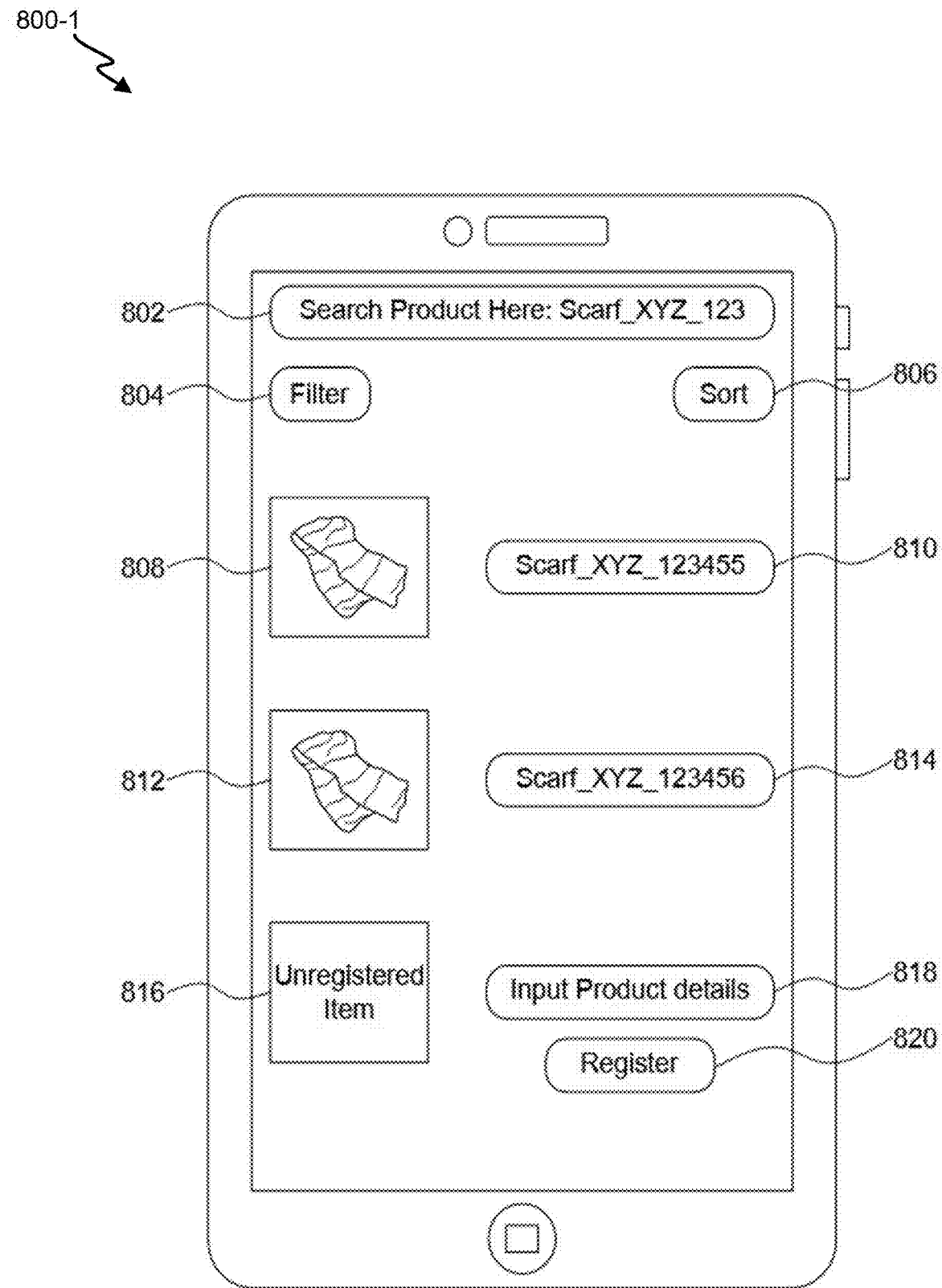
FIGS. 8A-8B illustrate example embodiments of an application interface generated by the system.

FIG. 8A illustrates an example embodiment of an application interface 800-1 generated by system 100. Application interface 800-1 is a computer-generated application associated with operation(s) of image processing unit 112 of backend module 102. The application is hosted by application console 126 and displayed to the user of frontend module 104 on input-output interface 438. Application interface 800-1 includes elements 802-820.

Element 802 indicates an option to provide input(s) for registering a batch of identical items. Element 802 enables the user of frontend module 104 to provide a batch identifier (or a batch tag) to the batch of identical items.

Element 804 indicates an option to provide input(s) to filter a category for the batch of identical items. Element 804 enables the user of frontend module 104 to provide input(s) to select the category for the batch of the identical items based on a set of pre-defined category filters.

Element 806 indicates an option to sort the category of the batch of identical items. Element 804 enables the user of frontend module 104 to provide input(s) to sort the category for the batch of the identical in a pre-defined set of ways.

Elements 808 and 812 indicate registered objects of the batch of identical objects. Elements 810 and 814 indicate identifiers for the registered objects presented in elements 808 and 812, respectively. The identical object is registered by submitting an analysis image and providing input(s) corresponding to the metadata of the identical object.

Element 816 indicates an unregistered identical object. Element 818 indicates an option to provide details of an unregistered identical object. Element 818 enables the user of frontend module 104 to provide details of the unregistered identical object. The input(s) may include an analysis image and metadata of the unregistered object.

Element 820 indicates an option to provide input(s) to register an unregistered object based on the input(s) provided at element 818.

In some aspects of the present disclosure, a count of identical objects in the batch may be selected by the user of frontend module 104, based on which multiple registration elements such as elements 802-820 are generated on application interface 800-1. In some aspects of the present disclosure, when all the identical objects in the batch are registered, the application renders another application interface on input-output interface 438.

Figure 8B:
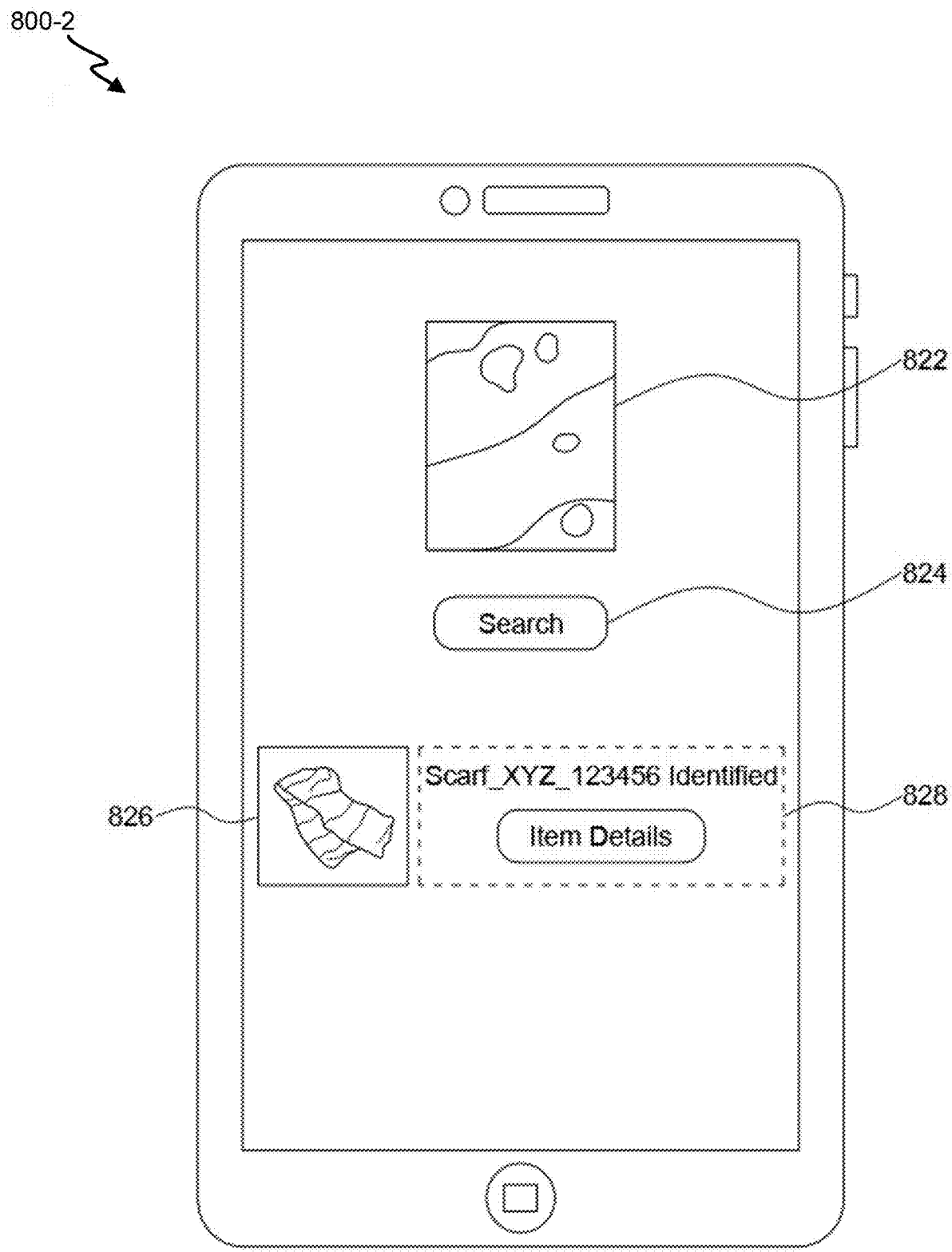

FIG. 8B illustrates an example embodiment of an application interface 800-2 generated by system 100. Application interface 800-2 is a computer-generated application associated with operation(s) of backend module 102. The application is hosted by application console 126 and displayed to the user of frontend module 104 on input-output interface 438. Application interface 800-2 includes elements 822-828.

Element 822 indicates an option to capture an analysis image captured for one identical object of the batch of the identical objects. Element 822 enables the user of user device hosting frontend module 104 to capture the analysis image for identification of the identical object from the batch of identical objects.

Element 824 indicates an option to analyze the analysis image. Element 824 enables the user of frontend module 104 to submit the analysis image for identification by backend module 102.

Element 826 indicates an object identified corresponding to the submitted analysis image.

Element 828 indicates the status of identity of the identical object. Element 828 further indicates an option to view details of the identified object. Element 828 enables the user of user device hosting frontend module 104 to view details of the identified identical object, that are stored in database 116.

Figure 9:
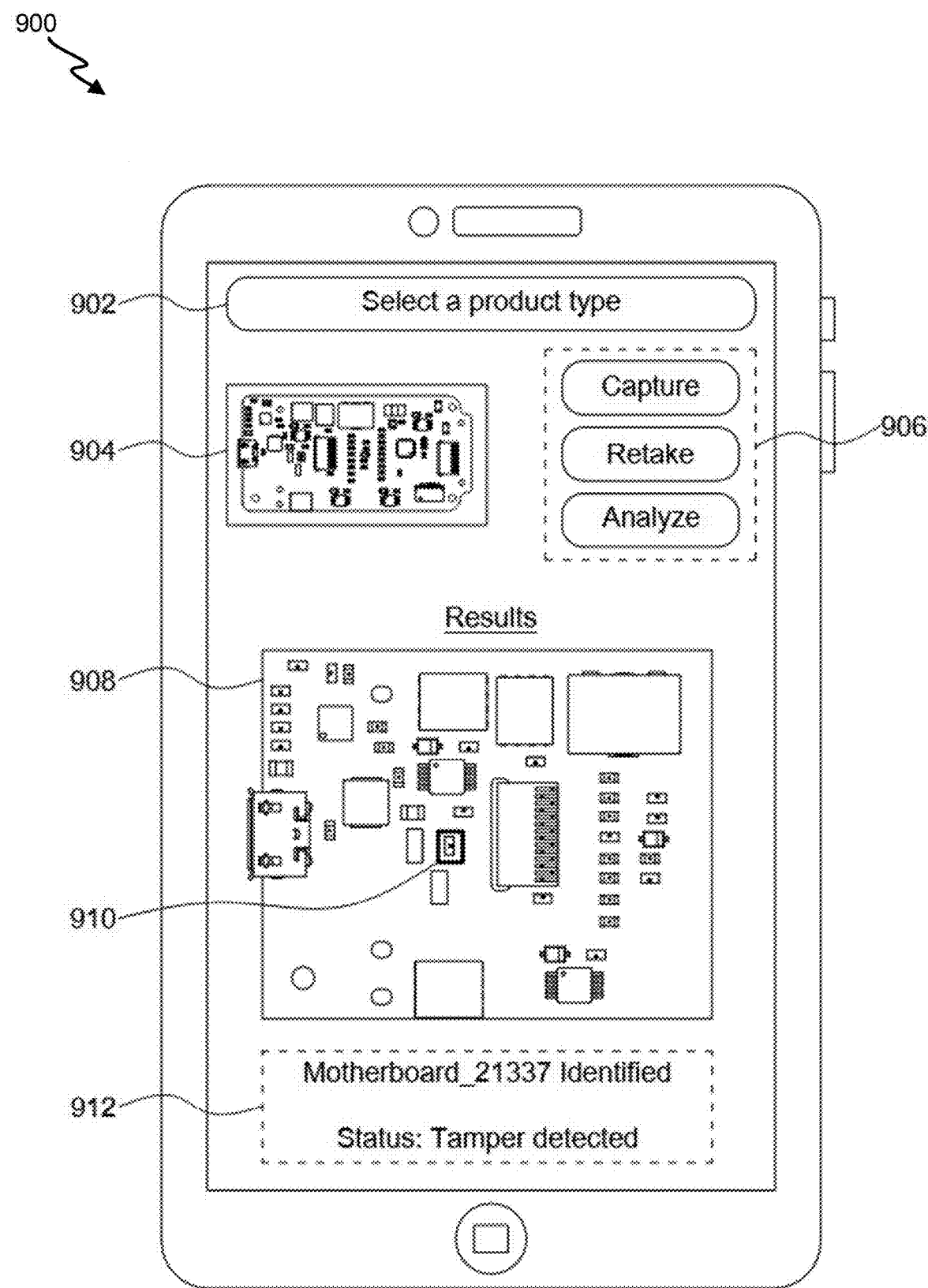
FIG. 9 illustrates an example embodiment of an application interface generated by the system.

FIG. 9 illustrates an example embodiment of an application interface 900 generated by system 100. Application interface 900 is a computer-generated application associated with operation(s) of image processing unit 112 of backend module 102. The application is hosted by application console 126 and displayed to the user of frontend module 104 on input-output interface 438. Application interface 900 includes elements 902-912.

Element 902 indicates an option to select a product type for identification of a status of the product. Element 902 enables the user of frontend module 104 to provide input(s) for selection of the product type for categorization of the product or for selection of a specific product.

Element 904 indicates an option to enable a live video feed from frontend module 104. Element 906 indicates options to capture and analyze the analysis image from the live feed. Element 906 enables the user of frontend module 104 to capture, re-capture and/or submit the analysis image to backend module 102 for analysis.

Element 908 indicates an identified object based on the analysis image. Element 910 indicates a portion of the identified object, where a tamper is detected. Elements 908 and 910 enable the user to view a tampered portion on the identified object.

Element 912 indicates the identity and tamper status of the identified object. Element 912 enables the user to identify the object and determine the status of the tamper on the object.

Figure 10:
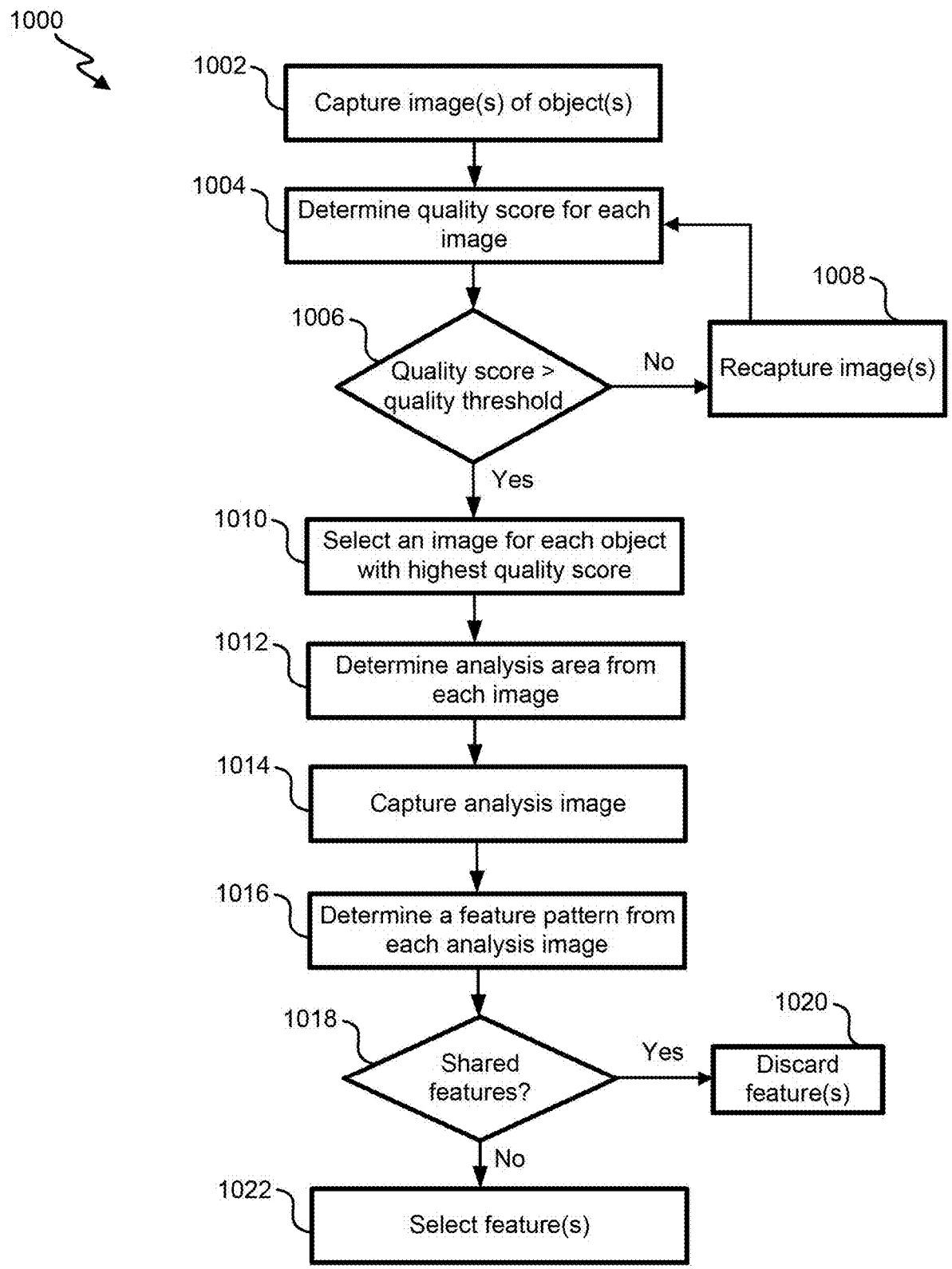
FIG. 10 is a flowchart that depicts a process for selecting feature(s) for a physical object, according to an exemplary embodiment.

FIG. 10 is a flowchart that depicts a process 1000 for selecting feature(s) for a physical object, according to an exemplary embodiment.

At block 1002, multiple images of the object are captured. In some aspects of the present disclosure, each captured image is an unprocessed image. In other aspects of the present disclosure, each captured image is analyzed to identify image processing filter(s) using a deep-learning model from ML models 114. In a scenario, when an image is detected to be processed by image processing filter(s), a reverse filter is generated, that nullifies effect(s) of image processing and results in unprocessed image.

At block 1004, a quality score is determined for each captured image. In some aspects of the present disclosure, a set of select parameters may be identified specific to the object, based on an object type. The set of select parameters includes a first set of parameters that are associated with the structure of material of the object and a second set of parameters that are associated with a process of manufacturing the object. Further, multiple features are determined based on the set of select parameters. Furthermore, each feature is assigned a weight using ML model(s) 114. An information score is generated for each feature using the assigned weight. Moreover, the information is determined for each image based on a weighted sum of each feature of the multiple features in each image. The quality score is generated for each image based on the information in each image.

At block 1006, the quality score of each image is compared with a quality threshold value. When the quality score(s) of image(s) is/are determined to be higher than the quality threshold, the process proceeds to block 1010. Else when the quality score(s) of image(s) is/are determined to be lower than or equal to the quality threshold, the process proceeds to block 1008.

At block 1008, when the quality score(s) of image(s) is/are determined to be less than the quality score, another image is captured corresponding to the image(s) with quality score(s) less than the quality threshold and the process loops back to block 1004. The loop continues for a pre-defined count of iterations and discards the image(s) having the quality score below the quality threshold after the pre-defined count of iterations.

At block 1010, when the quality score is more than the quality threshold, one image is selected. In some aspects of the present disclosure, an image having the highest quality score among the other images having quality scores higher than the quality scores is selected.

At block 1012, a first analysis area is determined from the selected image.

At block 1014, the first analysis image is captured corresponding to the first analysis area. In some aspects of the present disclosure, a template corresponding to the first analysis area is generated, that aids in capturing the analysis image. Preferably the first analysis image is a macro-image with a pixel resolution of at least 800 ppi. In some aspects of the present disclosure, the first analysis image is captured using a macro-lens.

At block 1016, a first feature pattern is determined from the first analysis image by image processing station 112. In some aspects of the present disclosure, ML model(s) 114 are trained to determine feature pattern(s) from occurrence of a first set of features in the analysis image. The first set of features are selected by ML models 114 based on the object type determined through the received categorization input(s). Image processing unit 112 utilizes ML models 114 to determine the first feature pattern from the first analysis image.

At block 1018, another set of features corresponding to other object(s) is determined by image processing unit 112 using ML model(s) 114. Based on a comparison of the set of features for the object with the other sets of features corresponding to the other objects, a set of common features is identified from the set of features by image processing unit 112.

At block 1020, the shared feature(s) from the first set of features are discarded by image processing unit 112.

At block 1022, the remaining feature(s) of the first set of features (i.e., excluding the shared feature(s) are selected as first select feature(s) by image processing unit 112.

Figure 11:
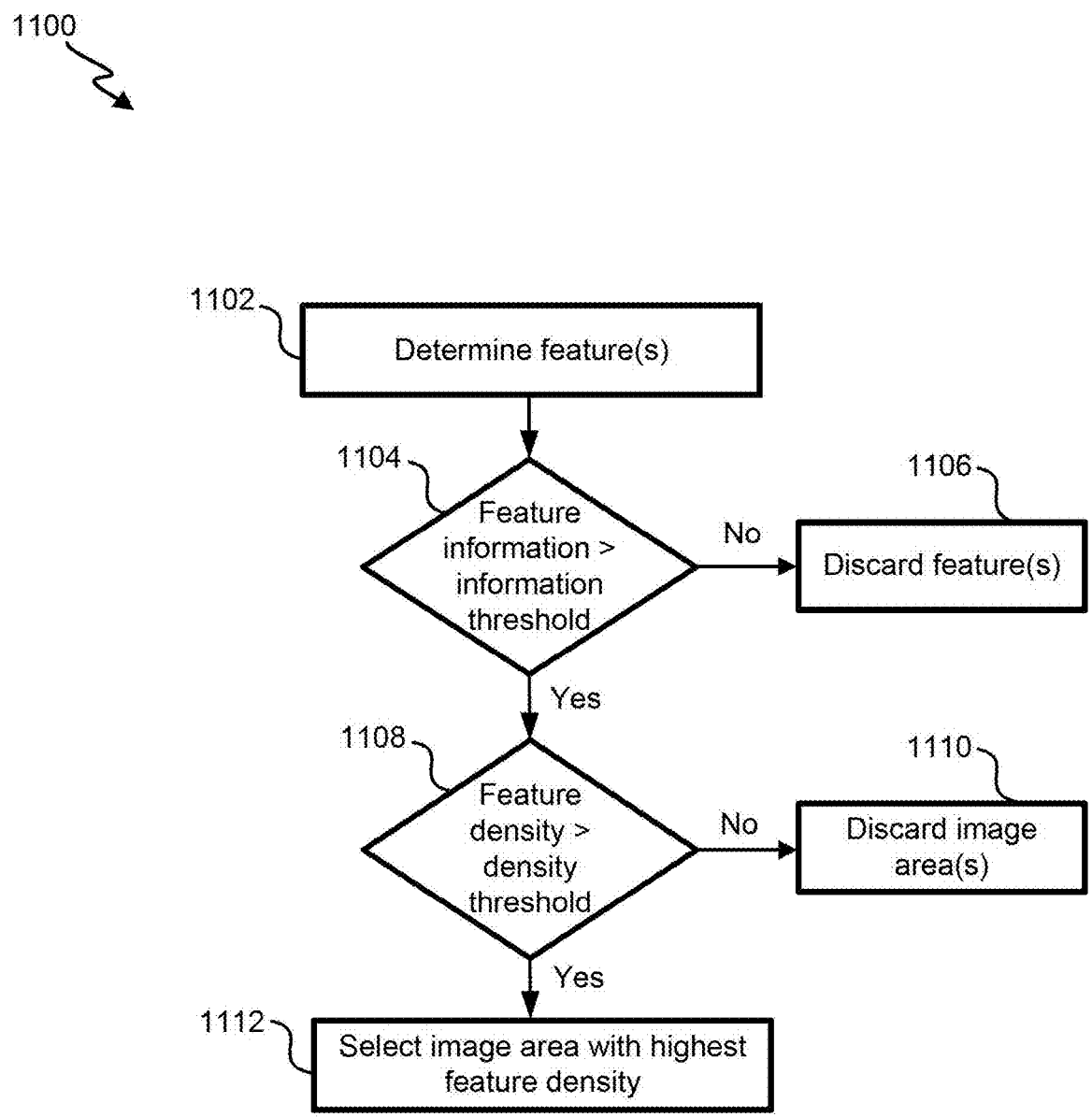
FIG. 11 is a flowchart that depicts a process for determining an analysis area of a physical object, according to an exemplary embodiment.

FIG. 11 is a flowchart that depicts a process 1100 for determining the analysis area of the physical object, according to an exemplary embodiment.

At block 1102, multiple features are determined by image processing unit 112 from a selected image of the object.

At block 1104, information from each feature is determined by image processing unit 112. The information of each feature is further compared with an information threshold. At block 1106, feature(s) having feature information below the information threshold is/are discarded and the remaining feature(s) is/are identified as the set of features.

At block 1108, the density of the set of features in the image is determined by image processing unit 112. The raw image is further segregated into multiple segments. At block 1110, segment(s) having feature density less than the density threshold is/are discarded. At step 1112, a segment from the multiple segments, that has highest feature density is selected by image processing unit 112 as the analysis area.

Figure 12:
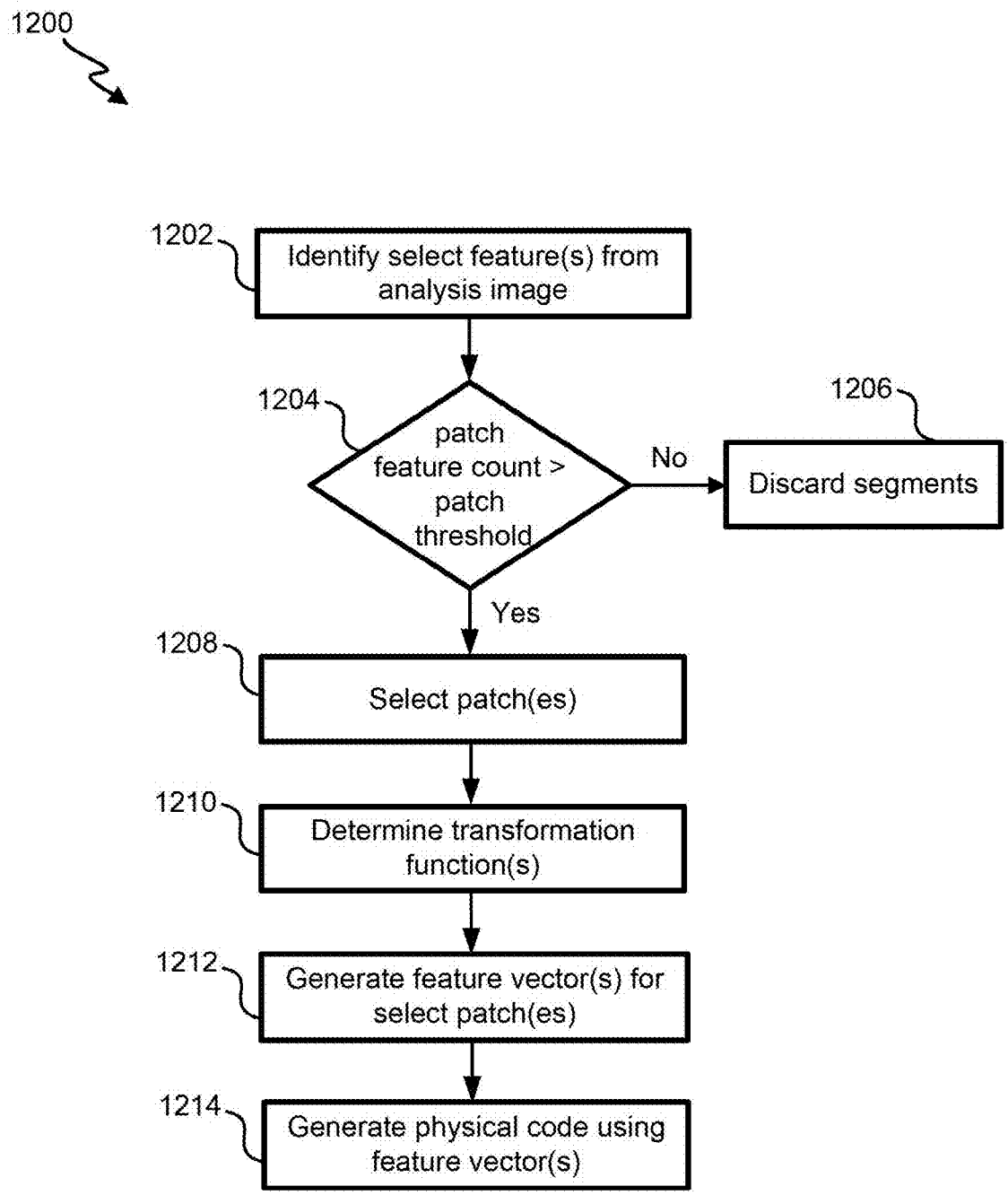
FIG. 12 is a flowchart that depicts a process for generating a physical code for a physical object, according to an exemplary embodiment.

FIG. 12 is a flowchart that depicts a process 1200 for generating a physical code for the physical object, according to an exemplary embodiment.

At block 1202, a set of select features are identified from the analysis image by the image processing unit 112.

At block 1204, based on the select features, the analysis image is segregated into multiple patches. In some aspects of the present disclosure, each patch may have a length of at least 0.5 cm and a width of at least 0.5 cm. Further, a count of select features in each patch is determined image by image processing unit 112. Patch(es) having select feature count less than or equal to a pre-defined patch threshold are discarded at block 1206. Patch(es) having select feature count above the patch threshold is/are identified as select patch(es) image by image processing unit 112 at block 1208. In some aspects of the present disclosure, the patch threshold is equal to ten.

At block 1210, a transformation function (i.e., immutable fiber) is determined for each patch by image processing unit 112 using ML model(s) 114. The transformation function is specific to the set of select features in each patch.

At block 1212, a feature-vector is generated for each patch. In some aspects of the present disclosure, a code layer is further generated for the object. The code layer includes the set of feature-vectors, image(s), metadata, and template for the object.

At block 1214, the physical code is generated using the set of feature-vectors. In some aspects of the present disclosure, image processing unit 112 generates the physical code for the object using an encoding (or encryption) technique such as a data hashing technique.

Figure 13:
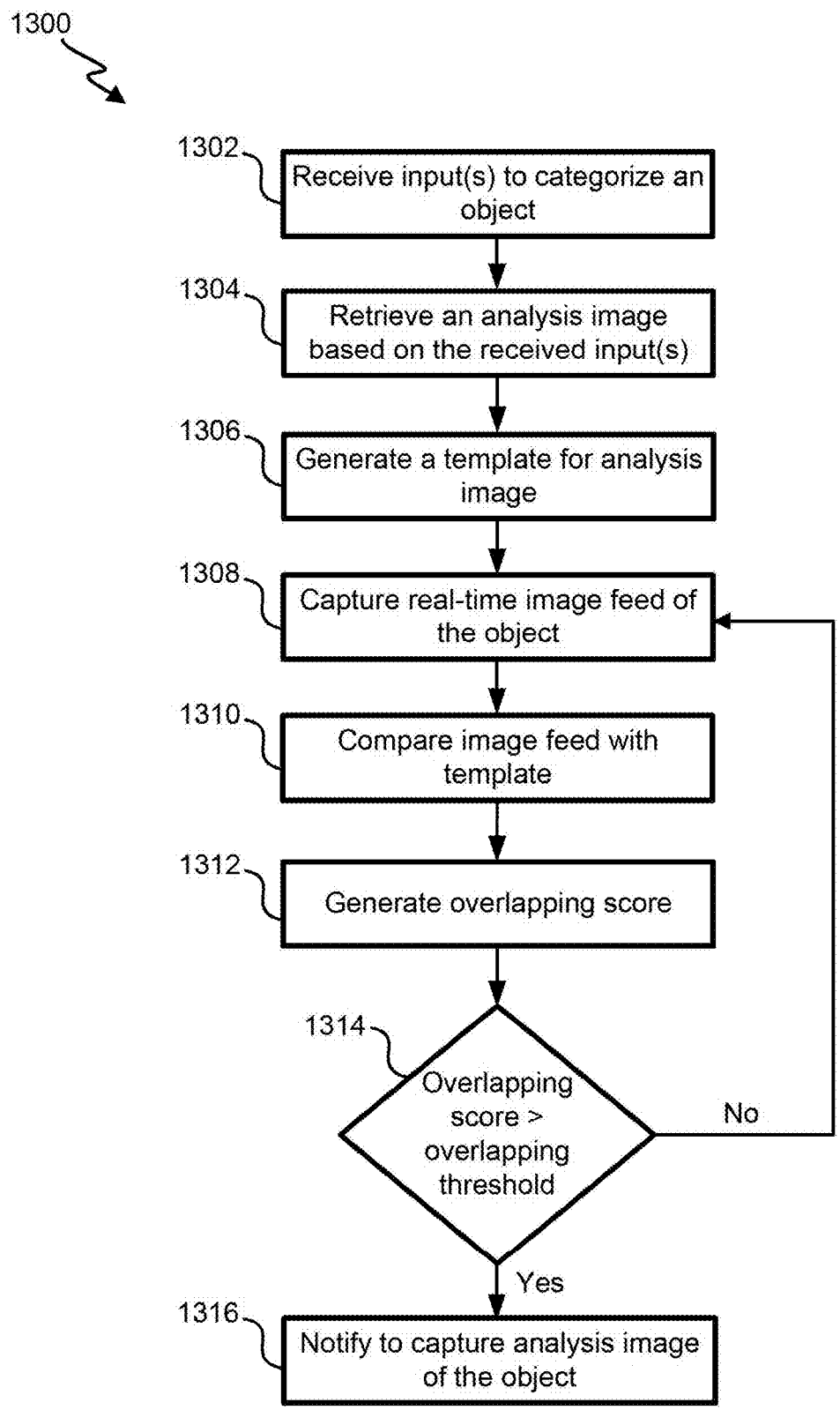
FIG. 13 is a flowchart that depicts a process for aligning a physical object, according to an exemplary embodiment.

FIG. 13 is a flowchart that depicts a process 1300 for aligning of the physical object, according to an exemplary embodiment.

At block 1302, input(s) to categorize (i.e., categorization inputs) the physical object are received by image processing unit 112. The categorization inputs enable selection of a specific portion of database 116 associated with the physical object corresponding to the input(s).

At block 1304, a first analysis image is retrieved by image processing unit 112 from the specific portion of database 116.

At block 1306, a template (e.g., a translucent digital filter) is retrieved corresponding to the first analysis image from database 116. The template may further include select feature(s) of the first analysis image. In some aspects of the present disclosure, the template for the object is generated by SDK 124 using computer vision model(s) 420. The template is then stored in database 116 to be used for testing or verifying the object (i.e., identification, authentication, and/or tamper detection of the object).

At block 1308, a real-time image feed (e.g., a video feed) is captured by frontend module 104. The video feed along with the template is presented on input-output interface 438 of frontend module 104.

At block 1310, the video feed is compared with the template.

At block 1312, based on the comparison of the video feed with the template, an overlapping score is generated.

At block 1314, the overlapping score is compared with an overlapping threshold. When the overlapping score is less than or equal to the overlapping threshold, process 1300 loops back to block 1308 and continues to capture the real-time image feed. Else when the overlapping score is higher than the overlapping threshold, process 1300 proceeds to block 1316.

At block 1316, a notification to capture the analysis image is generated. The notification can be displayed on input-output interface 438 that enables the user of frontend module 104 to capture the analysis image of the physical object. In some aspects of the present disclosure, the notification can be generated on an Augmented Reality (AR) interface of frontend module 104.

Figure 14:
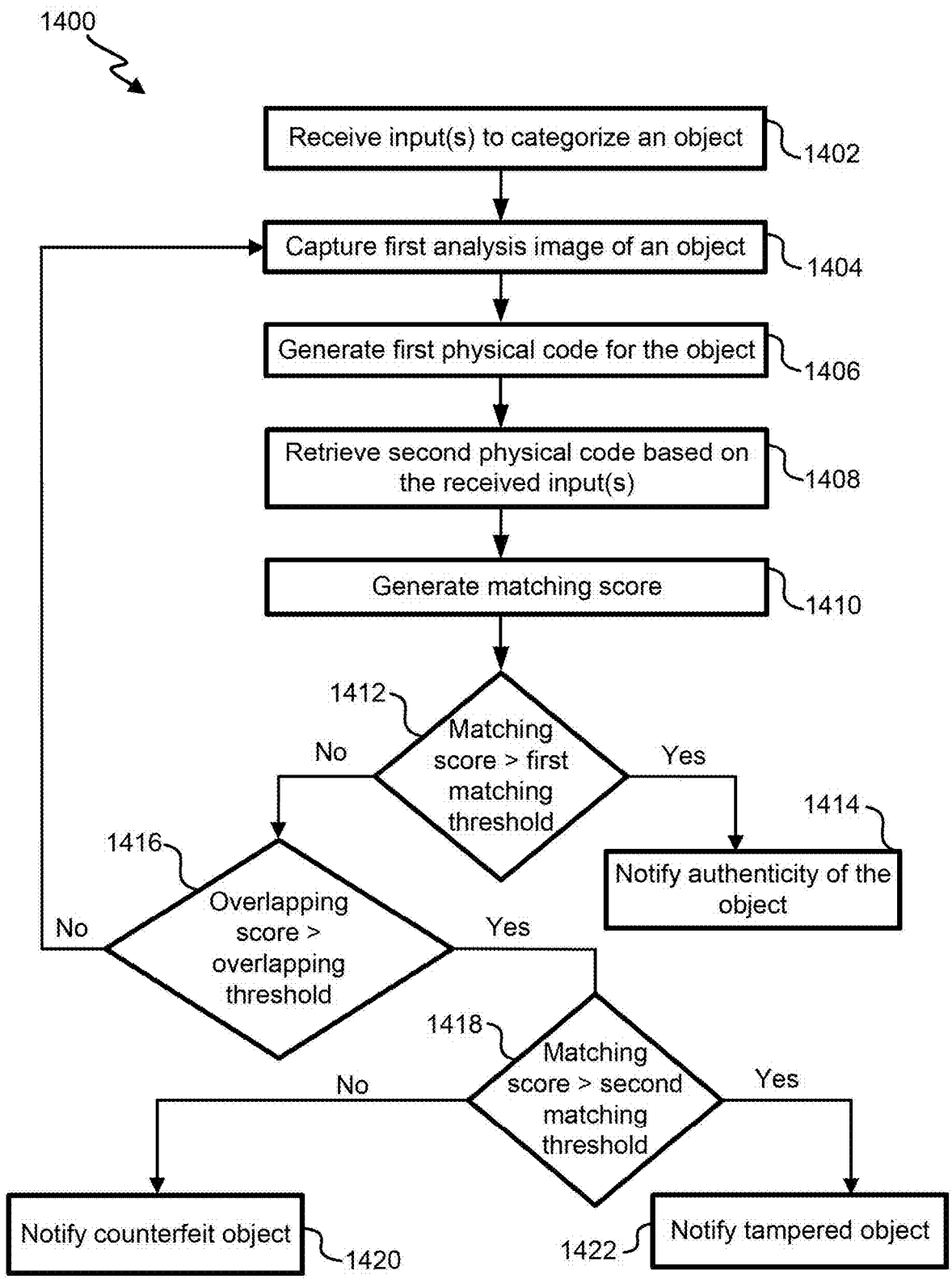
FIG. 14 is a flowchart that depicts a process for authenticating a physical object, according to an exemplary embodiment.

FIG. 14 is a flowchart that depicts a process 1400 for authenticating a physical object, according to an exemplary embodiment.

At block 1402, input(s) to categorize the object (i.e., categorization inputs) are received at the backend module 102.

At block 1404, a first analysis image of the object is captured.

At block 1406, a second physical code is generated by image processing unit 112 based on the captured second analysis image.

At block 1408, a first physical code is retrieved from database 116 based on the categorization input(s) of the object.

At block 1410, a matching score is generated based on a comparison of the first physical code and the second physical code by the image processing unit 112. In some aspects of the present disclosure, a first set of feature-vectors (i.e., associated with the first physical code) are compared with a second set of feature-vectors associated with the retrieved first physical code to generate the matching score. In some other aspects of the present disclosure, a first set of functions (i.e., the immutable fibers or the transformation functions) associated with the generated first physical code are compared with a second set of functions (i.e., immutable fibers or transformation function) associated with the retrieved first physical code to generate the matching score.

At block 1412, the matching score is compared with a first matching threshold. When the matching score is greater than the first threshold, process 1400 proceeds to block 1414, else when the matching score is less than or equal to the matching threshold, process 1400 proceeds to block 1416.

At block 1414, backend module 102 generates a notification associated with a status for machine authentication of the physical object for user device hosting frontend module 104 that displays "verification of authenticity" to the user of frontend module 104.

At block 1416, the overlapping score has been compared with the overlapping threshold by image processing unit 112. When the overlapping score is less than or equal to the overlapping score, process 1400 loops back to block 1404. The loop continues for a pre-defined count of iterations and reports an error when repeated otherwise and stops. Else when the overlapping score is higher than the overlapping threshold, process 1400 proceeds to block 1418.

At block 1418, the matching score is further compared to a second matching threshold by image processing unit 112. When the matching score is less than or equal to the second threshold, process 1400 proceeds to block 1420; else when the matching score is greater than the second matching threshold, process 1400 proceeds to block 1422.

At block 1420, image processing unit 112 generates a notification associated with a status for machine authentication of the physical object for frontend module 104 to display a status of "the counterfeit object".

At block 1422, image processing unit 112 generates a notification associated with a status for machine authentication of the physical object for frontend module 104 to display a status of "tampering on the object". In some aspects of the present disclosure, image processing unit 112 may further compare first set of features (i.e., associated with the first physical code) with a second set of features (i.e., associated with the second physical code retrieved from database 116) to determine the status of machine authentication of the physical object. The site of tamper can further be displayed on input-output interface 438.

Figure 15:
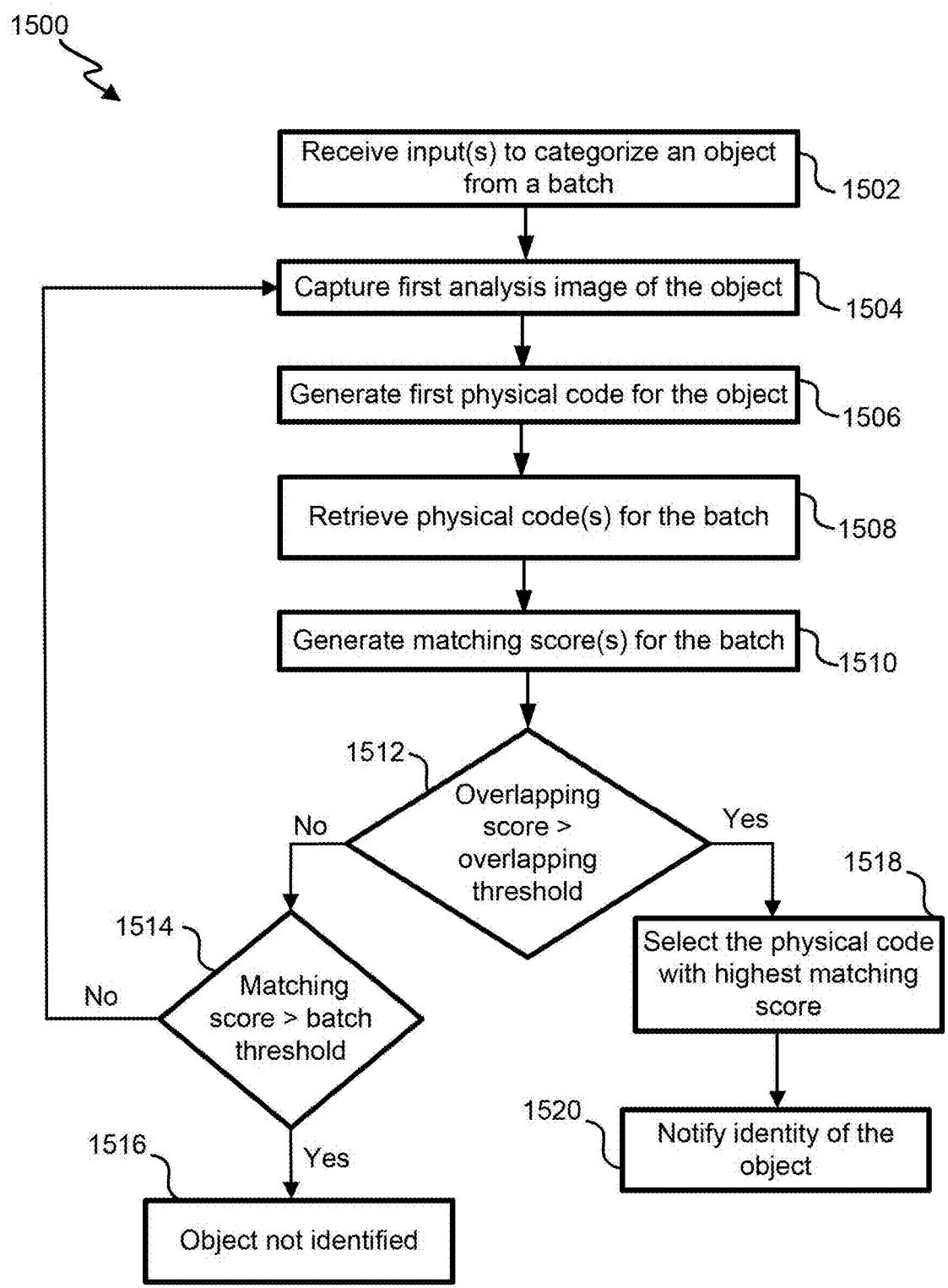
FIG. 15 is a flowchart that depicts a process for identifying a physical object from a batch of physical objects, according to an exemplary embodiment.

FIG. 15 is a flowchart that depicts a process 1500 for identifying a physical object from a batch of identical physical objects, according to an exemplary embodiment.

At block 1502, input(s) to categorize the object (i.e., categorization input(s)) from the batch of identical objects are received at backend module 102.

At block 1504, the second analysis image of the object is captured.

At block 1506, a second physical code is generated by image processing unit 112 based on the captured second analysis image.

At block 1508, a set of physical codes associated with the batch of identical objects is retrieved from the database based on the input(s) to categorize the object.

In some aspects of the present disclosure, a second set of feature-vectors associated with the generated physical code is compared with another sets of feature-vectors associated with the retrieved batch physical code to generate the matching score. In some other aspects of the present disclosure, a second set of functions (i.e., immutable fibers or transformation functions) associated with the generated second physical code are compared with another sets of transformation functions associated with the retrieved batch physical code to generate the matching score.

At block 1512, the overlapping score has been compared with the overlapping threshold. When the overlapping score is less than the overlapping threshold, process 1500 proceeds to block 1514. Else when the overlapping score is greater than or equal to the overlapping threshold, the process 1500 proceeds to block 1518.

At block 1514, the matching score is compared with a batch threshold. When the matching score is greater than the first threshold, process 1500 proceeds to block 1504, else when the matching score is less than or equal to the batch threshold, process 1500 proceeds to block 1516 and notifies the end user with notification of "object not identified".

At block 1518, when the overlapping score is greater than the overlapping threshold, backend module 102 selects a physical code from the batch physical codes having the highest matching score and generates a notification to verify the identity at block 1520.

Figure 16:
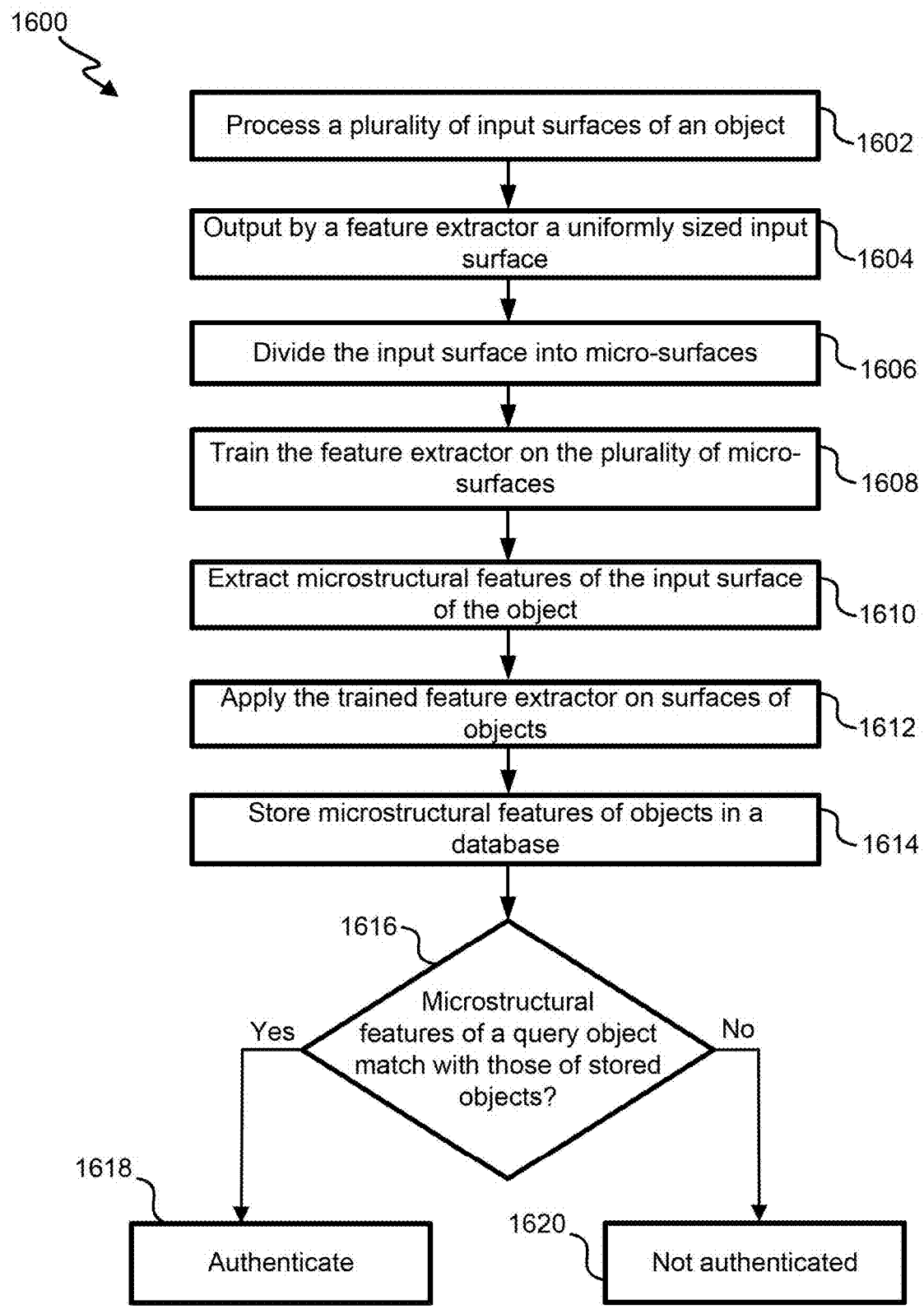
FIG. 16 is a flowchart that depicts a process for authentication and identification of a physical object based on microstructural features extracted from patches of a surface of the physical object, according to an exemplary embodiment.

FIG. 16 is a flowchart that depicts a process 1600 for authentication of a physical object based on microstructural features extracted from patches of a surface of the physical object, according to an exemplary embodiment.

At block 1602, input surfaces of an object are processed by feature extractor 312 of ML models 114 of backend module 102. The input surfaces vary in dimensions, and the input surfaces are processed by the deep neural network from images of the object captured by device camera 120. The input surface is a digital image of the input surface of the object captured by device camera 120.

At block 1604, a uniformly sized input surface from the input surfaces is output by feature extractor 312 to model interface 302 of ML models 114. The input surface is further used to train feature extractor 312.

At block 1606, the input surface of the object is divided into micro-surfaces. The micro-surfaces are small patches from the input surface of the object. The micro-surfaces include detailed features of the input surface of the object.

At block 1608, feature extractor 312 is trained on the micro-surfaces. The features from the micro-surfaces are identified by feature extractor 312.

At block 1610, feature extractor 312 is trained to identify and extract microstructural features of the input surface of the object.

At block 1612, after feature extractor 312 is trained on identifying and extracting microstructural features from the input surface of the object, the trained feature extractor 312 is applied on surfaces corresponding to objects. The surfaces have different dimensions from the input surfaces.

At block 1614, feature extractor 312 identifies and extracts a set of microstructural features of the surfaces corresponding to the plurality of objects. The set of microstructural features corresponding to the plurality of objects is stored in database 116.

At block 1616, a request to identify and authenticate a query object is received at backend module 102. Feature extractor 312 is applied on the query object to extract microstructural features of the query object in a similar manner as the set of microstructural features were extracted for the objects. The microstructural features of the query object are obtained and matched with the set of microstructural features of the objects that are stored in database 116. Each of the microstructural features of the input surface of the query object matches or differs with one or more of the microstructural features of objects in database 116.

Based on a result of the match performed at block 1616, the query object is identified and authenticated. If the match of the query object is found in database 116, then at block 1618, the query object is identified with the matched object in database 116 and therefore, authenticated. Else at block 1620, the query object is not authenticated when a match is not found in database 116.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as required regarding every variation of the systems, methods, and/or apparatuses disclosed herein. Furthermore, references to "the disclosure" and/or "the present disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, non-volatile, or other storage medium and is not to be limited to any particular type of memory or number of memories, or type of media upon which memory is stored.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Implementation of the techniques, blocks, steps and means described above may be done in various ways. For example, these techniques, blocks, steps and means may be implemented in hardware, software, or a combination thereof. For a digital hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. For analog circuits, they can be implemented with discreet components or using monolithic microwave integrated circuit (MMIC), radio frequency integrated circuit (RFIC), and/or micro electro-mechanical systems (MEMS) technologies.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of +20% or +10%, +5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of +20% or +10%, +5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

While the principles of the disclosure have been described above in connection with specific apparatuses and methods, it is to be clearly understood that this description is made only by way of example and not as limitation on the scope of the disclosure.

We claim:

1. A method for authentication of a physical object based on microstructural features extracted from patches of a surface of the physical object, the method comprising:
    processing a plurality of input surfaces of an object by a feature extractor using a deep neural network, wherein the plurality of input surfaces varies in dimensions, and the plurality of input surfaces are processed by the deep neural network from a plurality of images of the object captured by a device camera;
    outputting by the feature extractor, an input surface from the plurality of input surfaces which is uniformly sized with respect to sizes of the plurality of input surfaces wherein the feature extractor describes the input surface as a one-dimensional feature vector;
    dividing the input surface of the object into a plurality of micro-surfaces;
    training the feature extractor on the plurality of micro-surfaces to identify a plurality of microstructural features of the input surface of the object;
    applying the trained feature extractor on a plurality of surfaces corresponding to a plurality of objects, the plurality of surfaces have different dimensions from the plurality of input surfaces;
    storing a set of microstructural features of the plurality of surfaces corresponding to the plurality of objects in a database; and
    using the trained feature extractor for authenticating a plurality of query objects based on the plurality of microstructural features of the input surface corresponding to each query object, wherein the authentication includes matching the plurality of microstructural features obtained from images of a query object with the set of microstructural features of the plurality of objects stored in the database.

2. The method of claim 1, wherein the input surface is a digital image of the input surface of the object.

3. The method of claim 1, wherein a pooling layer of the feature extractor is one of: an average pooling layer in a neural network, a global maximum pooling layer in the neural network, a global sum pooling layer in the neural network or a global generalized mean pooling layer in the neural network.

4. The method of claim 1, wherein the feature extractor is based on a convolutional neural network.

5. The method of claim 1, wherein each of the plurality of microstructural features of the input surface of the query object matches or differs with one or more of the microstructural features in the database.

6. The method of claim 1, wherein the plurality of microstructural features are filtered to select microstructural features having a maximum inclusion in one or more input surfaces of the plurality of input surfaces.

7. A system for authentication of a physical object based on microstructural features extracted from patches of a surface of the physical object, the system comprises:
   a backend module including machine learning (ML) models configured to process a plurality of input surfaces of an object by a feature extractor of the ML models using a deep neural network, wherein the plurality of input surfaces varies in dimensions, and the plurality of input surfaces are processed by the deep neural network from a plurality of images of the object captured by a device camera, and
   the backend module is configured to:
      receive by the feature extractor, an input surface from the plurality of input surfaces which is uniformly sized with respect to sizes of the plurality of input surfaces wherein the feature extractor describes the input surface as a one-dimensional feature vector;
      divide the input surface of the object into a plurality of micro-surfaces;
      train the feature extractor on the plurality of micro-surfaces to identify a plurality of microstructural features of the input surface of the object;
      apply the trained feature extractor on a plurality of surfaces corresponding to a plurality of objects, the plurality of surfaces have different dimensions from the plurality of input surfaces;
      store a set of microstructural features of the plurality of surfaces corresponding to the plurality of objects in a database; and
      use the trained feature extractor for authenticating a plurality of query objects based on the plurality of microstructural features of the input surface corresponding to each query object, wherein the authentication includes matching the plurality of microstructural features obtained from images of a query object with the set of microstructural features of the plurality of objects stored in the database.

8. The system of claim 7, wherein the input surface is a digital image of the input surface of the object.

9. The system of claim 7, wherein a pooling layer of the feature extractor is one of: an average pooling layer in a neural network, a global maximum pooling layer in the neural network, a global sum pooling layer in the neural network or a global generalized mean pooling layer in the neural network.

10. The system of claim 7, wherein the feature extractor is based on a convolutional neural network.

11. The system of claim 7, wherein each of the plurality of microstructural features of the input surface of the query object matches or differs with one or more of the microstructural features in the database.

12. The system of claim 7, wherein the plurality of microstructural features are filtered to select microstructural features having a maximum inclusion in one or more input surfaces of the plurality of input surfaces.

13. A computer-program product tangibly embodied in a non-transitory machine-readable storage medium, including instructions configured to cause a data processing apparatus to perform operations, for authenticating a physical object based on microstructural features extracted from patches of a surface of the physical object, the operations comprising:
   processing a plurality of input surfaces of an object by a feature extractor using a deep neural network, wherein the plurality of input surfaces varies in dimensions, and the plurality of input surfaces are processed by the deep neural network from a plurality of images of the object captured by a device camera;
   outputting by the feature extractor, an input surface from the plurality of input surfaces which is uniformly sized with respect to sizes of the plurality of input surfaces wherein the feature extractor describes the input surface as a one-dimensional feature vector;
   dividing the input surface of the object into a plurality of micro-surfaces;
   training the feature extractor on the plurality of micro-surfaces to identify a plurality of microstructural features of the input surface of the object;
   applying the trained feature extractor on a plurality of surfaces corresponding to a plurality of objects, the plurality of surfaces have different dimensions from the plurality of input surfaces;
   storing a set of microstructural features of the plurality of surfaces corresponding to the plurality of objects in a database; and
   using the trained feature extractor for authenticating a plurality of query objects based on the plurality of microstructural features of the input surface corresponding to each query object, wherein the authentication includes matching the plurality of microstructural features obtained from images of a query object with the set of microstructural features of the plurality of objects stored in the database.

14. The computer-program product of claim 13, the input surface is a digital image of the input surface of the object.

15. The computer-program product of claim 13, wherein a pooling layer of the feature extractor is one of: an average pooling layer in a neural network, a global maximum pooling layer in the neural network, a global sum pooling layer in the neural network or a global generalized mean pooling layer in the neural network.

16. The computer-program product of claim 13, wherein the feature extractor is based on a convolutional neural network.

17. The computer-program product of claim 13, wherein each of the plurality of microstructural features of the input surface of the query object matches or differs with one or more of the microstructural features in the database.

18. The computer-program product of claim 13, wherein the plurality of microstructural features are filtered to select microstructural features having a maximum inclusion in one or more input surfaces of the plurality of input surfaces.

* * * * *